(12) United States Patent
Hickman et al.

(10) Patent No.: US 7,100,069 B1
(45) Date of Patent: Aug. 29, 2006

(54) METHOD AND APPARATUS FOR CONTROLLING A COMPUTER OVER A WIDE AREA NETWORK

(75) Inventors: Paul L. Hickman, Los Altos Hills, CA (US); Michael L. Gough, Ben Lomond, CA (US)

(73) Assignee: G&H Nevada-Tek, Incline Village, NV (US)

( * ) Notice: Subject to any disclaimer, the term of this patent is extended or adjusted under 35 U.S.C. 154(b) by 0 days.

(21) Appl. No.: 08/798,703

(22) Filed: Feb. 12, 1997

Related U.S. Application Data

(60) Provisional application No. 60/011,827, filed on Feb. 16, 1996.

(51) Int. Cl.
*G06F 11/00* (2006.01)

(52) U.S. Cl. .......................................... 714/4; 709/208
(58) Field of Classification Search ................ 713/200, 713/201, 202; 709/203, 213, 216, 219, 217, 709/229, 208; 714/4
See application file for complete search history.

(56) References Cited

U.S. PATENT DOCUMENTS

| | | | |
|---|---|---|---|
| 5,241,625 A | | 8/1993 | Epard et al. ................. 395/163 |
| 5,457,797 A | * | 10/1995 | Butterworth et al. ........ 395/650 |
| 5,530,852 A | * | 6/1996 | Meske, Jr. et al. .......... 395/600 |
| 5,568,612 A | * | 10/1996 | Barrett et al. ................ 709/203 |
| 5,636,371 A | * | 6/1997 | Yu .............................. 395/500 |
| 5,696,901 A | * | 12/1997 | Konrad .................. 395/200.09 |
| 5,701,451 A | * | 12/1997 | Rogers et al. ............... 395/600 |
| 5,706,434 A | * | 1/1998 | Kremen et al. ......... 395/200.09 |
| 5,732,219 A | * | 3/1998 | Blumer et al. .......... 395/200.57 |
| 5,737,560 A | * | 4/1998 | Yohanan ..................... 395/349 |
| 5,737,607 A | * | 4/1998 | Hamilton et al. ............ 395/701 |
| 5,825,772 A | * | 10/1998 | Dobbins et al. ............. 370/396 |
| 5,838,682 A | * | 11/1998 | Dekelbaum et al. ........ 370/401 |
| 5,838,906 A | * | 11/1998 | Doyle et al. ................. 709/202 |

(Continued)

OTHER PUBLICATIONS

"More Data at Twice the Speed," San Jose Mercury News, Friday, Mar. 1, 1996, pp. 2c.

(Continued)

*Primary Examiner*—Dieu-Minh Le
(74) *Attorney, Agent, or Firm*—TIPS Group

(57) ABSTRACT

The present invention permits virtually the entire functionality of a computer system to be made accessible over a network such as the Internet or an Intranet. More particularly, the present invention permits a computer system to be run as a "virtual machine" through a web page provided at a web site on the World Wide Web (WWW). The apparatus of the present invention includes a plurality of computers arranged in a wide area network (WAN) such as the Internet or an Intranet. At least one of the computers has at least one unique address designating a web site. A host computer system (which may or may not be one of the computers on the Internet) can be "posted" onto an "advertising" web page at the web site to permit other computers coupled to the Internet to interact directly with the host computer system. The computer "posted" on the web page is referred to as the "host" or "advertiser" computer, and computers accessing the host computer are referred to as "client" or "user" computers. Having the host computer posted on a web page creates a "virtual computer" that can be view and/or controlled by the client computers. Once the connection has been made between the host computer and one or more client computers, the web page is bypassed, i.e. the two or more computer systems communicate through the Internet without necessarily going through the web site supporting the "advertising" web page.

21 Claims, 26 Drawing Sheets

U.S. PATENT DOCUMENTS 5,909,545 A * 6/1999 Frese, II et al. ............ 709/208
5,992,752 A * 11/1999 Wilz, Sr. et al. ........ 235/472.01

OTHER PUBLICATIONS

"Farallon Netopia Virtual Office," NetGuide, Jun. 1997, pp. 24.
"Farallon to Add Scripting Hooks to Timbuktu 4," MacWeek, Jun. 9, 1997, pp. 7.
Gianturco, Michael, "Souped-Up Windows," Forbes, Jul. 29, 1996, pp. 88.
Staten, James, "Windows Apps via the Internet," MacWeek, Jul. 22, 1996, pp. 14.
Petreley, Nicholas, "Broadway Debut Could Upstage Web-Based Trio Java, Active X, OpenDoc," RCVD Jul. 21, 1997.
"Software Will Run Windows Through Web Browsers," San Jose Mercury News, Jan. 27, 1997, pp. 4e.
"Microsoft Pursues Multiuser NT," IW Mar. 3, 1997, pp. 28.

* cited by examiner

METHOD AND APPARATUS FOR CONTROLLING A COMPUTER OVER A WIDE AREA NETWORK

CROSS REFERENCE TO RELATED APPLICATIONS

This application claims the benefit of copending U.S. Provisional Patent Application No. 60/011,827, entitled Method and Apparatus for Controlling a Computer over a Wide Area Network, filed Feb. 16, 1996 on behalf of Paul L. Hickman and Michael L. Gough.

This application is related to copending U.S. patent application Ser. No. 08/798,702, filed Feb. 12, 1997, entitled Method and Apparatus for Controlling a Computer over a TCP/IP Protocol Network of Paul L. Hickman, filed on an even day herewith and owed in common with the present application, and incorporated herein by reference in its entirety.

TECHNICAL FIELD

This invention relates generally to networks of computer systems, and more particularly to wide area networks such as the Internet World Wide Web.

BACKGROUND ART

The Internet has, of late, become extremely popular. The origins of the Internet date back several decades to a U.S. government sponsored military/educational/business wide area network (WAN) that was designed to remain operational even in the event of the catastrophe, e.g. a major earthquake or a nuclear war. To accomplish this goal, robust protocols and systems were developed which allowed a non-hierarchical, geographically distributed collection of computer systems to be connected as a WAN such as the loss of a particular computer, or group of computers, would not preclude the continued communication among the remaining computers.

Each computer on the Internet can support one or more "entities" or "domains." These entities are addressed on the Internet with a domain name which uniquely identifies the domain. Individual users within a domain are provided with names unique to that domain. For example, to communicate with John Smith at a domain "hacksoft", electronic mail or "e-mail" could be sent, for example, to john_smith@hacksoft.com. The suffix "com" means that the domain belongs to a commercial entity (e.g. a business), the suffix "gov" means that the domain belongs to a government entity, and the suffix "edu" means that the domain belongs to an educational entity (such as a University). Other suffixes are available, e.g. for specific foreign countries.

While the use of the Internet has been prevalent for many years now, its use has been limited by the arcane and difficult commands required to access the various computers on the network. To address this problem, a protocol known as the "World Wide Web" or "WWW" was developed to provide an easier and more user-friendly interface for the Internet.

With the World Wide Web an entity having a domain name creates a "web page" which provides information and, to a limited degree, some interaction with the entities "web site." By convention, Web pages are written in "hyper-text mark-up language", commonly referred to as "HTML." An address for a Web page site for a hypothetical company "Hacksoft" might be http//:www.hacksoft.com. The "http" is a prefix identifying the protocol, namely "hyper-text transfer protocol," the www refers to the World Wide Web, "hacksoft" is the domain name, and "com" means that it is a commercial enterprise. The full address for the Web page site, namely "http//:www.hacksoft.com", is known as the address or "URL" of the home page of the Web site.

A computer user can "cruise", i.e. navigate around, the WWW by utilizing a suitable web browser and an Internet service provider. For example, UUNET, America Online, and Global Village all provide Internet access. Currently, the most popular web browser is made by Netscape of Mountain View, Calif. The web browser allows a user to specify or search for a web page on the WWW, and then retrieves and displays the home page of the desired web page on the user's computer screen.

When a computer user "calls up" a web page, a variety of information may be displayed on the screen as determined by the entity maintaining the web site. HTML supports text and graphics, and permits "hyperlinks" that allow visitors to the web site to "jump" to (i.e. access and display) other web pages on the WWW. Therefore a person cruising the web may start on a web page of, for example, a company in Palo Alto, Calif., "click" on a hyperlink, and be connected to a web page of, for example, a University in the Netherlands. Clicking on a hyperlink on the on the Dutch University's web page may cause the user to be connected to a web page of, for example, a Government agency in Japan. In this fashion, the World Wide Web can be navigated and browsed for information in an intuitive and easy to use fashion, and information on computers from around the world may be accessed in an easy and intuitive manner.

Until recently, the World Wide Web was, essentially, primarily passive provider of information. There was some limited interactivity in that a computer user could leave certain information at a web site such as their name, address, phone number, etc. which could then be responded to by the entity maintaining the web site. Very recently, there as been an expansion of computational interaction over the World Wide Web. A system known as "Java™" developed by Sun Microsystems, Inc. of Mountain View, Calif. permits programs known as "Applets" to be transferred over the Internet, and run on a user's computer, regardless of the local machine's operating system or hardware. Java Applets are thus operating system and hardware independent. With Java software, a web page can be used to download an Applet to run on a computer user's machine. Typically, these Applets are small programs designed for a specific task, e.g. to create a graph, animate a display, or provide a spreadsheet, which serves a program function and is then discarded.

Before Java software, the World Wide Web resembled a large collection of hard disk drives which stored data retrievable by Internet users. With the advent of Java software, the World Wide Web is, in a limited fashion, gaining computational powers.

While Java software is a major advance in the functionality of the Internet, it still falls short of providing true computational power on the World Wide Web. Applets are small, typically transient programs designed for specific tasks. However, it is contemplated that it would be desirable to have a fully functioning computer system, such as a personal computer (PC), a workstation, a mini computer, a mainframe, or even a supercomputer that could provide vastly greater power and functionality to users of the World Wide Web. In addition, the presence of the computational power of larger systems on the Web would also provide for enhanced communication and functionality on the WWW, and would provide access to software applications that could not be implemented, in a practical manner, with an Applet.

There currently exists a species of software which permits a first computer ("master computer") to monitor and/or control the functionality of a second computer (slave computer). For example, the programs "Timbuktu" and "Carbon Copy" permit a master computer to control a slave computer, or to simply monitor the activity of the slave computer. More specifically, the screen of the master computer shows an image of the screen of the slave computer, and the keyboard and mouse of the master computer can provide inputs to (and thereby control) the slave computer.

While utility programs such as Timbuktu™ and Carbon Copy™ are useful when computers are directly coupled together (such as via a modem or a serial port connection) or when they are coupled together by a conventional local area network (LAN), they cannot be used to provide computational power to a WAN such as the WWW. Furthermore, these utility programs are designed for a single master/slave computer pair, and does not allow for the collaborative sharing of computer resources over, for example, the WWW.

DISCLOSURE OF THE INVENTION

The present invention permits virtually the entire functionality of a computer system to be made accessible to a wide area network such as the Internet. More particularly, the present invention permits a computer system to be run as a "virtual machine" through a web page provided at a web site on the World Wide Web (WWW).

The apparatus of the present invention includes a plurality of computers arranged in a wide area network (WAN) such as the Internet. At least one of the computers has at least one unique address designating a web site. A host computer system (which may or may not be one of the computers on the Internet) can be "posted" onto an "advertising" web page at the web site to permit other computers coupled to the Internet to interact directly with the host computer system. The computer "posted" on the web page is referred to as the "host" or "advertiser" computer, and computers accessing the host computer are referred to as "client" or "user" computers. Having the host computer posted on a web page creates a "virtual computer" that can be view and/or controlled by the client computers. Once the connection has been made between the host computer and one or more client computers, the web page is bypassed, i.e. the two or more computer systems communicate through the Internet without necessarily going through the web site supporting the "advertising" web page.

A client computer (which may or may not be one of the computers on the Internet) can interact with a host computer via the Internet in varieties of ways. For example, the client computer can be used to simply monitor the screen of the host computer. Alternatively, the client computer can be used to both monitor the screen of the host computer and to provide inputs to the host computer via a keyboard, mouse, or other input device. This, in certain circumstances, allows the client computer to control the functionality of the host computer. For example, the client computer can run a program on the host computer which provides the client computer with the aforementioned "virtual machine" on the Internet with computational powers that can be far greater than that provided, for example, by Java Applets. Also, the client computer can merely provide inputs to the host computer, without visual feedback, such as in a "blind bid" arrangement.

The present invention also allows a multiplicity of client computers to access the "virtual machine" via the Internet. This, in effect, allows multiple computer users to control a single host computer at a remote site. This can be very useful for collaborative activities performed over the Internet. Alternatively, a multi-tasking operating system on a host computer (such as Windows NT™ from Microsoft Corporation) would allow each window to be a "virtual machine" for one or more client computers.

An advantage of the present invention is that much greater computational power is accessible by users of the Internet and the WWW. The present invention will, for example, allow a client computer user to diagnose and fix problems on a host computer, run application programs that are available on the host computer, perform maintenance on the host computer, etc. Furthermore, users from multiple client computers can access a single host machine to permit collaborative or multiple individual efforts on that computer system.

These and other advantages of the present invention will become apparent upon reading the following detailed descriptions and studying the various figures of the drawings.

BEST MODES FOR CARRYING OUT THE INVENTION

Figure 1:
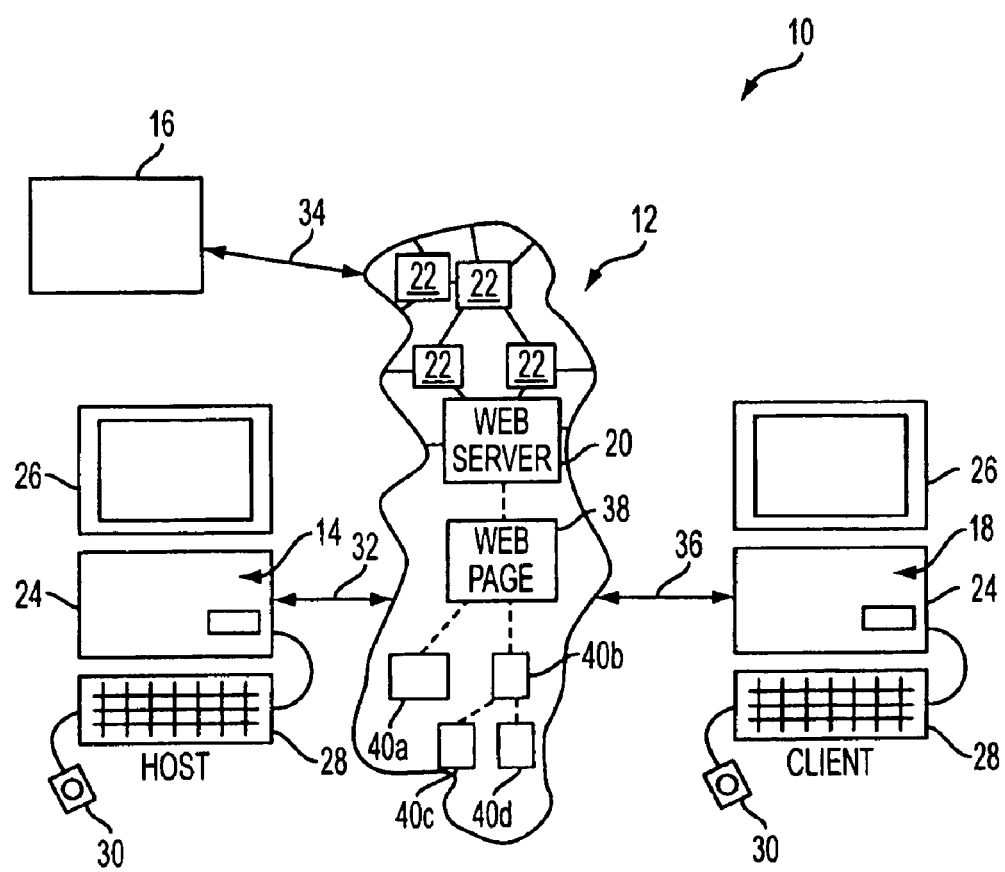
FIG. 1 is an illustration of an apparatus of the present invention.

In FIG. 1, a system 10 for controlling a computer over a wide area network such as the Internet 12 includes a number of computer systems, such as computer systems ("machines") 14, 16, and 18, that are coupled to the Internet 12. By implementing the processes, apparatus, and systems of the present invention, one or more of the computer systems 14–18 can monitor and/or access virtually the entire functionality of any other computers 14–18 connected to the Internet 12.

It should be noted that the semantics used herein can have multiple meanings. Looked at in one way, the machines 14, 16, and 18 are outside of the Internet 12 and communicate with the Internet by communication links. Looked at in another way, when the machines 14, 16, and 18 become a part of the Internet 12, i.e. the bubble surrounding the Internet 12 expands to include these machines. However, for the purpose of the present descriptions, a machine (i.e. a computer system) will be considered to be part of the Internet 12 if it examines and passes packets intended for other machines, and it will be considered to be merely connected to the Internet if another machine on the Internet (e.g. an Internet access provided) only passes the connected machine packets intended for that connected machine.

While the preferred wide area network of the present invention is the well-known Internet, it should be noted that other network systems capable of supporting the processes and apparatus of the present invention can also be utilized as an intermediary area between one or more computer systems 14–18. For example, other WANS such as cabled WANS (both private and public), wireless WANS, fiber-optic WANS etc. can also practice the present invention with suitable modifications to the base processes that would be apparent to those skilled in the art. Further, as is well known to those skilled in the art, the Internet is only one instance of a network using "TCP/IP" data packet transmission protocols. For example, private "Intranets" using TCP/IP protocols are essentially privately operated equivalents of the publicly accessible Internet. The construction and use of TCP/IP protocol networks such as the Internet and private Intranets, and the use of TCP/IP protocol data packets (or simply "TCP/IP data packets") sent over such networks, is well known to those skilled in the art.

As noted previously, the origins of the Internet dates back several decades to a U.S. government sponsored military/education/business wide area network designed to survive the worst of catastrophes. The Internet includes a large number of linked computer systems, which will be referred to herein as "web servers" such as a specified web server 20 and many other interconnected web servers 22.

In FIG. 1, web server 20 is shown to be "within" the Internet 12, i.e. it is connected as a node within the Internet as defined above. The architecture and operation of the Internet are well-known to those skilled in the art. For a description of the Internet and of the World Wide Web ("WWW") supported by the Internet, see HTML Publishing on the Internet, Kenny Chu and Francis Chin, McGraw Hill, 1996, the disclosure of which is incorporated herein by reference.

Each of the computer systems 14–18 typically include a processor unit 24, a video display ("monitor" or "screen") 26, a keyboard 28, and a "pointing" device such as a mouse 30. Computer systems such as computer systems 14–18 are well-known and are commercially available from a variety of manufacturers. In the following descriptions, the computer systems are described primarily in terms of Macintosh computer systems, although it will be appreciated by those skilled in the art that Microsoft Windows/Intel Microprocessor ("WINTEL") compatible computer systems, SUN and HP workstations, etc. can provide the same type of functionality.

The computer systems 14, 16, and 18 can be coupled to the Internet 12 (and could be considered to become a part thereof) in a variety of fashions. These Internet connection are shown generically at 32, 34, and 36, respectively. For example, the computer system 14 may be connected to a web server 20 or 22 on the Internet 12 with a modem and telephone line, a digital connection such as an ISDN telephone line, through the intermediary of a local area network (LAN), etc. Methods and apparatus for coupling computer systems such as computer systems 14–18 to the Internet are well-known to those skilled in the art.

The various "web servers" on the Internet are simply computer systems of any type which conform to the well-known Internet communication protocols. These web servers have a tremendous variations in computing power, ranging from personal computers to mainframe computers. These web servers often include monitors, keyboards, mice, etc. However, the web servers 20 and 22 can simply be a "box" on the Internet 12 with limited or no local input or output capabilities.

As it is well-known to those skilled in the art, the Internet 12 can be accessed by computers 14–18 using a number of protocols. One of the easiest and most popular user interfaces is known as the World Wide Web (WWW) which is described, inter alia, in HTML Publishing on the Internet, supra. With the WWW, a web server 20 can support one or more "web pages," such as web pages 38, 40a, 40b, 40c, and 40d. A web page is a software construct of "object" includes an interface written in HTML which permits text and images to be presented to a computer system that is coupled to or part of the Internet 12. A web page can include "hyperlinks" to other web pages, both on its local web server 20 and throughout the Internet 12. A "web site" on a web server 20 contains one or more web pages where a "base" or "home" page is the first or entry page into a desired web site. For example, the home page illustrated in FIG. 1 is the web page 38 which is linked via hyperlinks to additional web pages 40a–40d.

The method and apparatus of the present invention permits computer systems ("clients" or "users") to monitor or control the functionality of other computer systems ("hosts" or "advertisers") connected to the Internet 12 (such as computers 14–18), or which are a part of the Internet 12 (such as the web servers 20 and 22). As described herein, the "host" or "advertiser" machine becomes a "virtual machine" on the Internet 12 which can be accessed by the "client" or "user" machine. It should be noted that on the client or user side that any computer or machine ("platform") will be able to subscribe to a virtual machine, provided by any host platform. Thus, seemingly incompatible hardware could be used in concert; e.g. a WINTEL machine could be used as a client for a Macintosh host machine. In addition to providing great computational power through the Internet 12, the posting of a "virtual machine" on the Internet permits the client machine to be relatively low powered, i.e. an inexpensive computer system having a less powerful microprocessor, less memory, fewer peripherals etc. than the "virtual machine" provided by the host computer system.

As will be discussed in greater detail subsequently, and by way of example, the method and apparatus of the present invention permits a client computer system 18 to take over the functionality of a host computer system 14 such that the keyboard 28 and mouse 30 of computer system 18 provides inputs to the computer system 14, and such that images on the monitor of computer system 14 are replicated on the monitor 26 of the computer system 18. In this way, a "virtual machine" appears to be running on the monitor 26 of the client machine. In reality, the processing power and resources of the host system 14 are providing the "virtual machine" for the client computer system 18.

It should be noted that other inputs and outputs of the host machine 14 can also be sent and received by the client computer 18. For example, sounds generated by the computer system 14 can be "played" through the Internet 12 on computer system 18, while other inputs to computer system 18 (such as inputs from a tablet, not shown) can be transmitted for processing by the computer system 14. The capturing of outputs such as sounds and their transmission over the Internet is well known to those skilled in the art. Likewise, the transmission of other data representing inputs over the Internet would be well within the scope of those skilled in the art.

Figure 2:
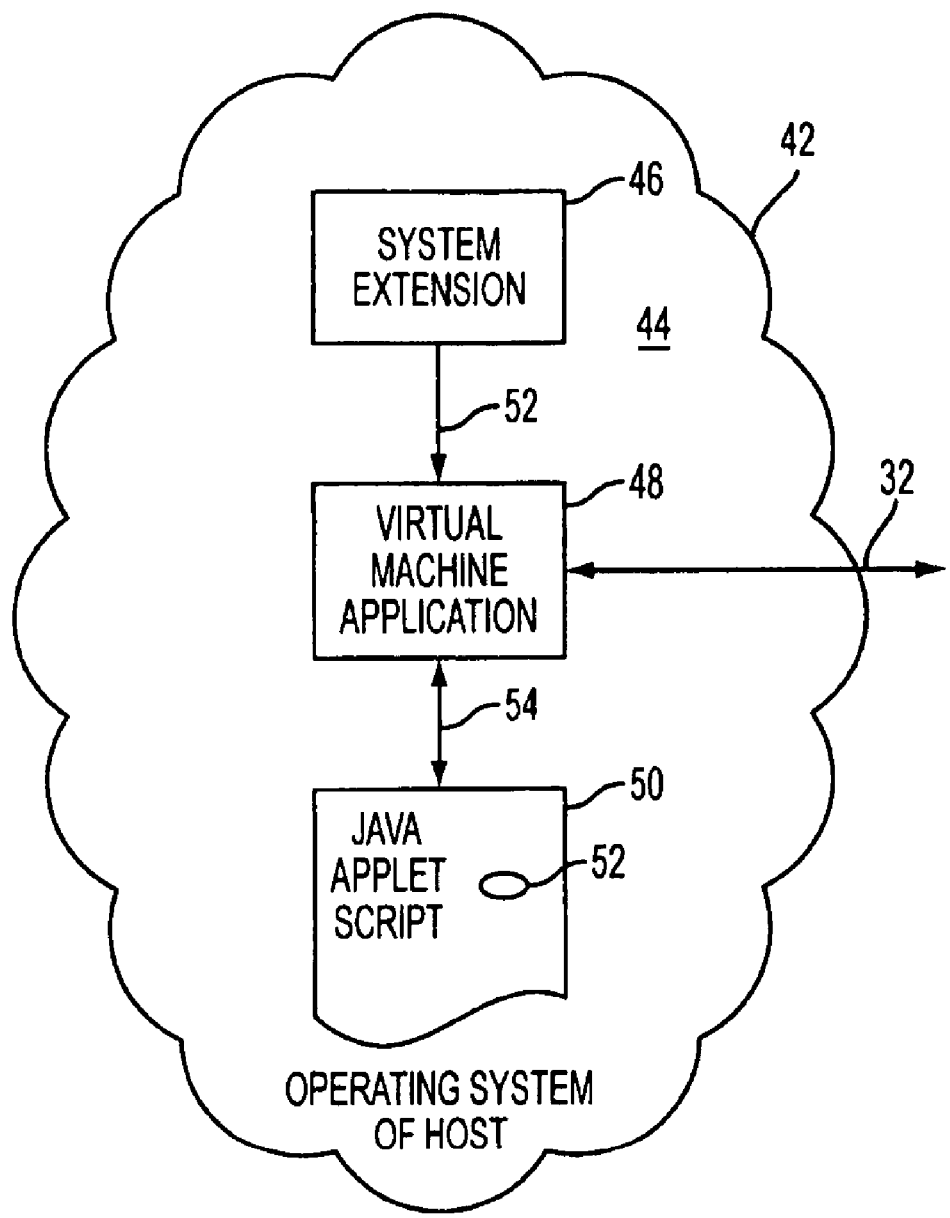
FIG. 2 is an illustration of the processes running on a host computer system of FIG. 1.

FIG. 2 illustrates a process 42 that can run on a host computer system, such as computer system 14. In a preferred embodiment of the present invention, the process 42 can originate entirely from a "host machine" i.e. from a host computer such as computer system 14. In other embodiments of the present invention, processes of the present invention may be distributed over the Internet to, for example, the web server 20 or to a client machine, such as on computer system 18.

In the process 42 of FIG. 2, an operating system 44 of the host supports a "system extension" 46, a virtual machine application 48, and a Java Applet script 50. The virtual machine application communicates with or becomes part of the Internet 12 over the link 32 as described previously.

The system extension 46 is also known, in the Macintosh world, as an "init." The system extension 46 is patched into the operating system 44 of the host computer system at system boot-time ("during power-up"). As such, the system extension 46 becomes part of the operating system of the host and "patches", "modifies", and "enhances" the functionality of the operating system. The purpose of the system extension 46 and the process 42 of the present invention will be discussed in greater detail subsequently.

The virtual machine application 48 is a computer program or "process" running from a host computer system, such as computer system 14. A virtual machine application is therefore started in a standard fashion to other application programs running on personal computer systems. For example, a computer system using a graphical user interface ("GUI"), an application program may be started (sometimes referred to as "executed", "evoked", "launched" etc.) by selecting and activating an icon representing the application program with a pointer controlled by an input device such as a mouse. Alternatively, the virtual machine application can be started by a number of other conventional techniques, such as with a selection from a pull-down menu, the entry of the name of the program on a command line, by a use of an alias, etc. The virtual machine application receives information from a system extension 46 as indicated by the arrow 52 and communicates with the Internet 12 via the communication link 32.

The Java Applet script 50 is a piece of "dead code" on the host computer system, i.e. it is not executed on the host computer system. Embedded in the Java Applet script is the Internet address 52 of the host machine. The virtual machine application 48 is preferably capable of changing the Java Applet script in that it can modify the script based on a number of criteria, and can also send the Applet onto the Internet 12 via the link 32. The virtual machine application 48 and the Java Applet script 50 interact as indicated at 54.

In other words, the virtual machine application 48 preferably generates a Java Applet script 50 by embedding the Internet address of the host machine as a constant in an existing Java Applet script 50 which has an undefined value for the Internet address. The completed Java Applet script 50 executes on the client machine and is described with reference to FIG. 20. The virtual machine application 48 can send the Java Applet script 50 onto the Internet 12 via the link 32.

Figure 3:
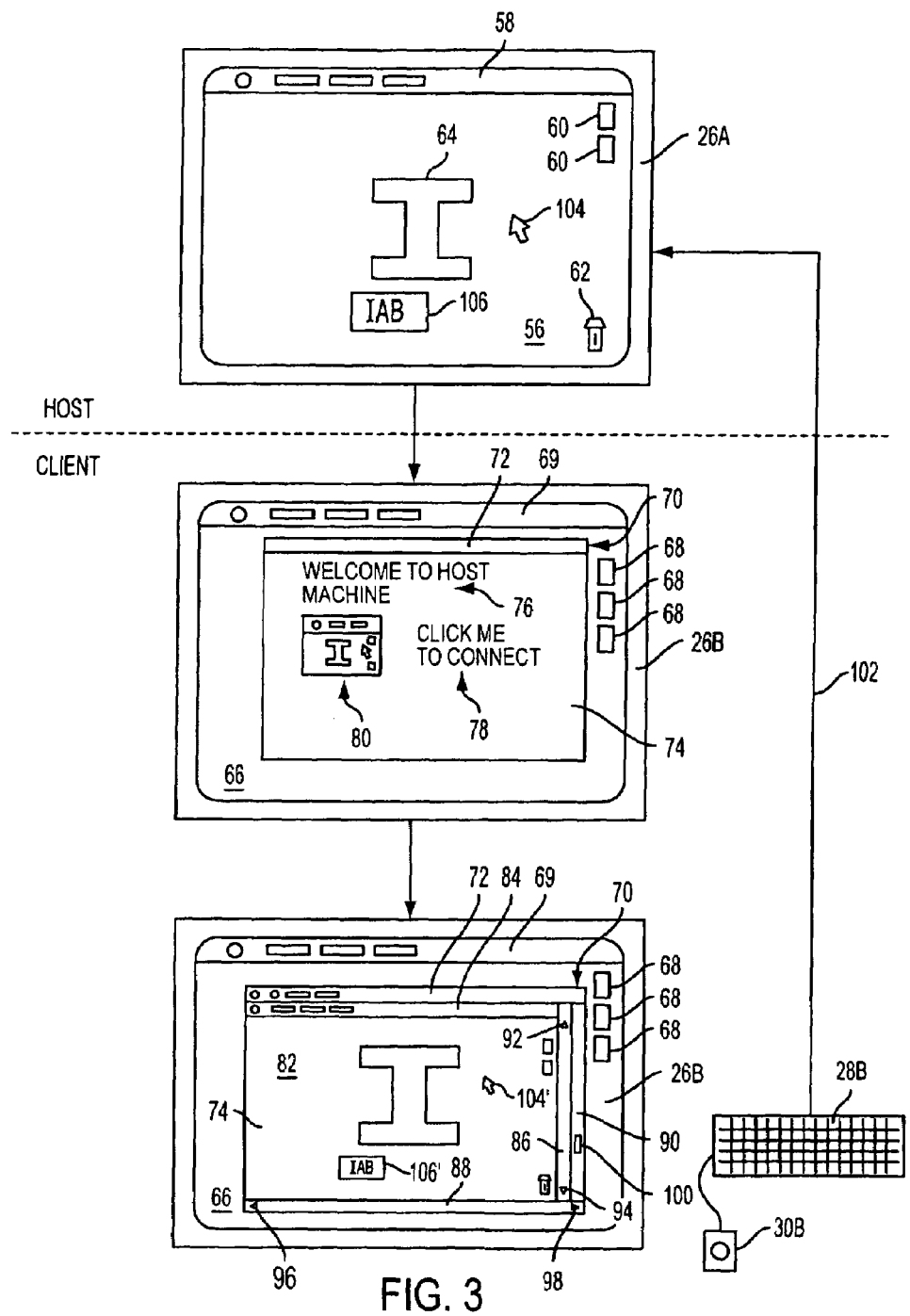
FIG. 3 is an illustration of the screen of a host computer and corresponding screens of a client computer of the system of FIG. 1.
Figure 3A:
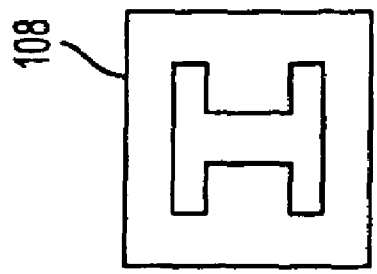
FIGS. 3a–3d illustrate four modes of interaction with the host machine of the system of FIG. 1
Figure 3B:
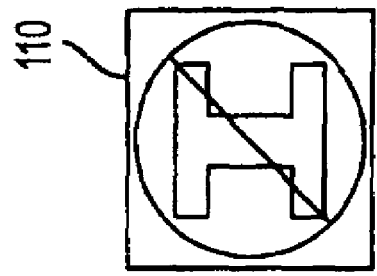

In FIG. 3, a monitor 26*a* of a host computer (such as a host computer system 16) and the monitor 26*b* of a client computer (such as client computer 18) are illustrated. The host computer monitor 26*a* includes a screen 56 displaying a number of images. More particularly, the screen 56 displays a menu bar 58, a number of icons 60 and 62, and one or more images 64. A monitor 26*b* of the client includes a screen 66 that can include a number of icons 68, a pull-down menu bar 69, and a "browser" window 70. An acceptable browser of the present invention is the popular Netscape™ browser made by Netscape, Inc. of Mountain View, Calif. having built-in Java capabilities.

The window 70 created by the browser includes a menu bar 72 and a page display area 74. In this instance, the display area 74 shows the "home page" created by a host machine, such as computer system 14. The home page 74 includes a greeting 76, instructions 78, and an icon 80. This icon 80 can be any suitable icon, such as a picture of a computer, or it can display the actual image displayed on the screen 56 of the host computer monitor 26*a*. In the latter instance, the icon 80 can be static or dynamic, i.e. the image displayed by the icon 80 can be a "snap shot" of the display on screen 56 at a particular point in time, or it can be dynamically updated to show changes in real time being made to the display of the monitor 26*a*.

At the bottom of FIG. 3, the monitor 26*b* shows the screen 66, icon 68, and pull-down menu bar 69 of the client computer system. Shown displayed on the screen 68 is the web browser window 70 having the menu bar 72. However, within the web browser 70 window area 74 is the image of the screen 56 of the host computer forming a "virtual computer" window 82. The virtual computer window 82 includes a pull-down menu bar 84, a vertical pan bar 86, a horizontal pan bar 88, and a zoom bar 90. The image within the virtual window 82 is at least a portion of the image displayed on the host computer monitor 26*a*. However, due to space and resolution limitations, the virtual computer window 82 may not be large enough or have a high enough resolution to show the entire image on the screen 56 of the host computer monitor 26*a*. For this reason, the vertical pan 86 includes scroll buttons 92 and 94 to allow an up and down vertical scrolling ("vertical panning") of the image displayed in the virtual computer window 82, the horizontal scroll bar 88 includes left and right scrolling buttons 96 and 98, respectively, to permit a left and right lateral scrolling ("lateral panning"), and a sliding zoom control 100 permits a zooming in and zooming out of the image displayed within the virtual machine window 82 to accommodate more and less of the image displayed on the screen 56 of the host machine 26*a*.

It will be apparent from the diagram of FIG. 3 that the image on the screen of the host computer 26*a* can be viewed within the virtual machine window 82 of the client machine monitor 26*b*. In addition, computer inputs from the client keyboard 28*b* and the client mouse 30*b* are coupled as indicated by the arrow 102 to the host computer to control the functionality of the host computer. Therefore, by way of example, movement of the client computer mouse 30*b* can control the position of a pointer 104 on the screen 56 of the host computer 26*a*. Also typing on the keyboard 28*b* of the client computer can, for example, input alpha-numeric characters into a window 106 of the host computer. Of course, such inputs will results within the virtual machine window of the client computer, i.e. the display pointer 104' will move and characters will appear within a window 106' within the virtual machine window 82 of the client computer.

It will noted that the present invention makes use of the Java programming language provided by Sun Microsystems, Inc. of Mountain View, Calif. As it will be apparent from the following descriptions, this provides a convenient method for implementing the processes and systems of the present invention from a host computer. Alternatively, other processes of the present invention will distribute the computational tasks among various web servers 20 and 22 on the Internet 12 and/or distribute computational tasks to a client computer, such as computer system 18. Such distributed systems and processes are considered to be equivalents within the scope of the present invention.

As it is well known to those skilled in the art, the terms "click," "select," and the like refer to the act of using a pointer, such as a mouse 30B, to position a pointer icon, such as a pointer icon 104, on a computer screen, such as computer screen 56, and then activating ("clicking") a button to cause an action at the location pointed to by the pointer icon 104. For example, clicking can press a button, open a file, activate a program, draw a line, etc. By "post" or "posting", it is meant that a computer implemented process is executed which causes a host machine coupled to the Internet to become available as a "virtual machine" on the Internet. The "virtual machine" refers to the fact that a fully functional computer appears to be available in the virtual machine window 82 of the client machine when, in fact, the actual computer can be anywhere on the Internet or can be any computer coupled to the Internet. For example, the virtual machine functionality may be provided by the computer system 14, the computer system 16, the web server 20, or any of the web servers 22 as long as they subscribe and implement the "virtual machine" protocols and processes of the present invention.

Figure 3C:
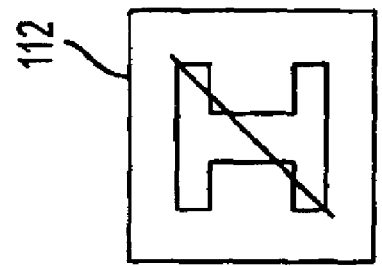
Figure 3D:
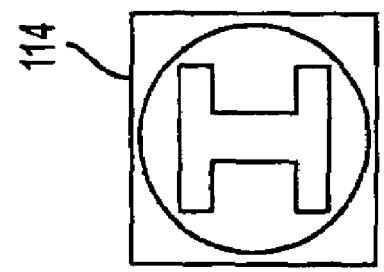

In FIGS. 3*a*–3*d*, various icons that can be displayed on the web page 74 for the "virtual machine" implemented by computer system 14 are illustrated. These icons can be used in place of icon 80 of FIG. 3, or in addition to icon 80. Icon 108 of FIG. 3*a* indicates that the "virtual machine" representing computer system 14 will permit complete input and output access to the computer system 14. The icon 110 of FIG. 3*b* indicates that no input or output is permitted to the computer system 14. This icon might be present, for example, if computer has already been preempted by another user (client) and if collaboration is not permitted. In FIG. 3*c*, the icon 112 indicates that no output is allowed from computer 14, but that inputs via keyboard, mouse, etc. are permitted. This mode might be permitted in blind bid or posting situations. In FIG. 3*d*, icon 114 indicates that outputs from the computer system 14 are permitted, but that inputs are not permitted. In the mode illustrated in FIG. 3*d*, the user of computer system 18 is essentially monitoring ("eavesdropping on") the computer system 14, but is not permitted to modify or influence its operation.

Figure 4:
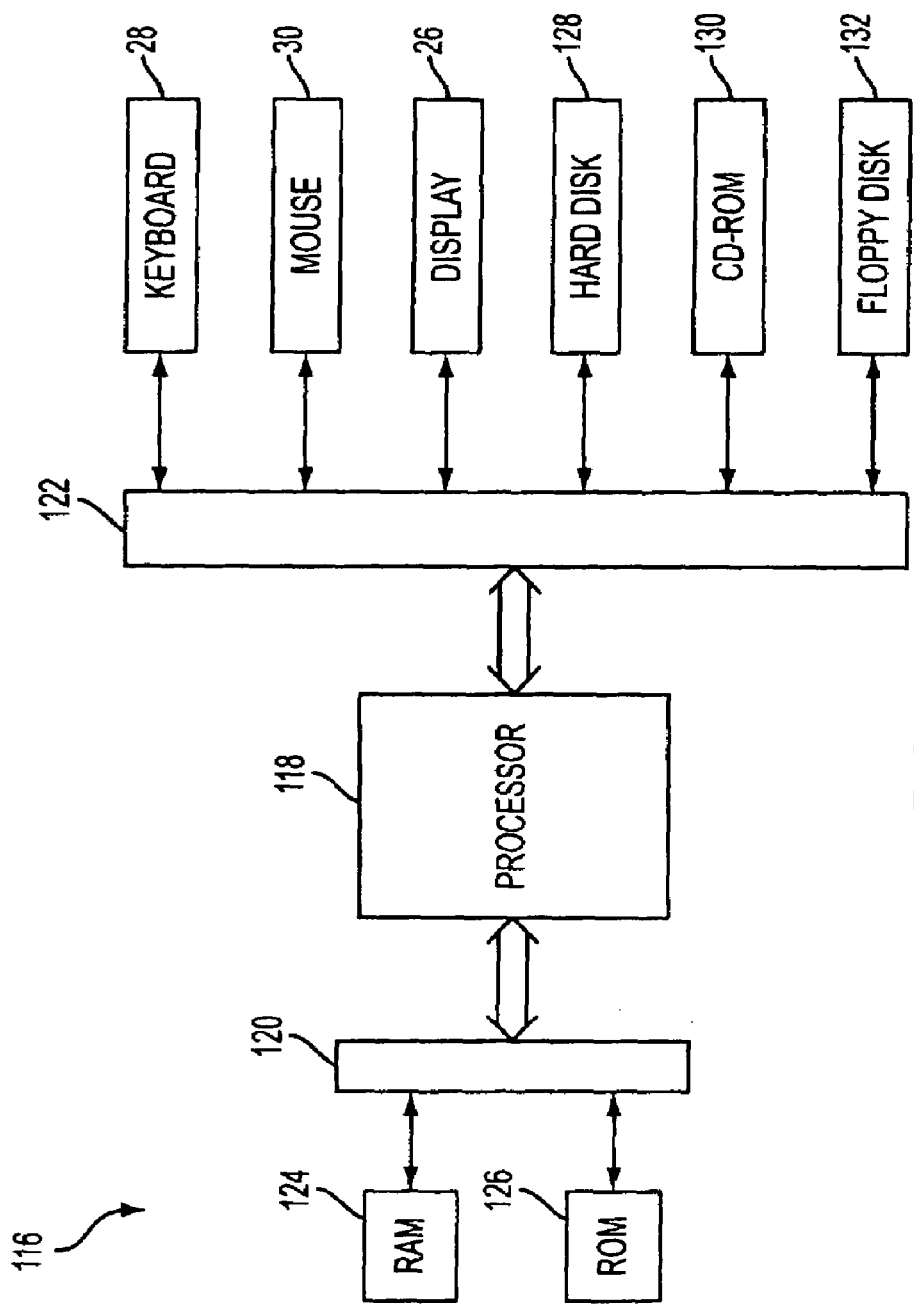
FIG. 4 is a block-diagram of an exemplary computer system in accordance with the present invention.

As noted from the above discussion, there are many "computer systems" involved in a wide area network such as the Internet. These computer systems include the computer systems 14–18 and some of the web servers 20 and 22. An exemplary block diagram of a single such computer system is shown in FIG. 4. More particularly, a computer system 116 in accordance with the present invention includes a processor 118, a high speed memory bus 120, and an input/output (I/O) bus 122. The processor 118 is coupled to both the memory bus 120 and the I/O bus 122. Coupled to the memory bus is typically random access memory (RAM) 124 and read only memory (ROM) 126. A number of "peripherals" can be coupled to the I/O bus including the keyboard 28, the mouse 30, the display 26, a hard disk 128, a CD ROM 130, and a floppy disk 132. Of course, various driver cards and driver protocols ("drivers") may be required for the various peripherals as well as special drives and media as it is well known to those skilled in the art.

Figure 5:
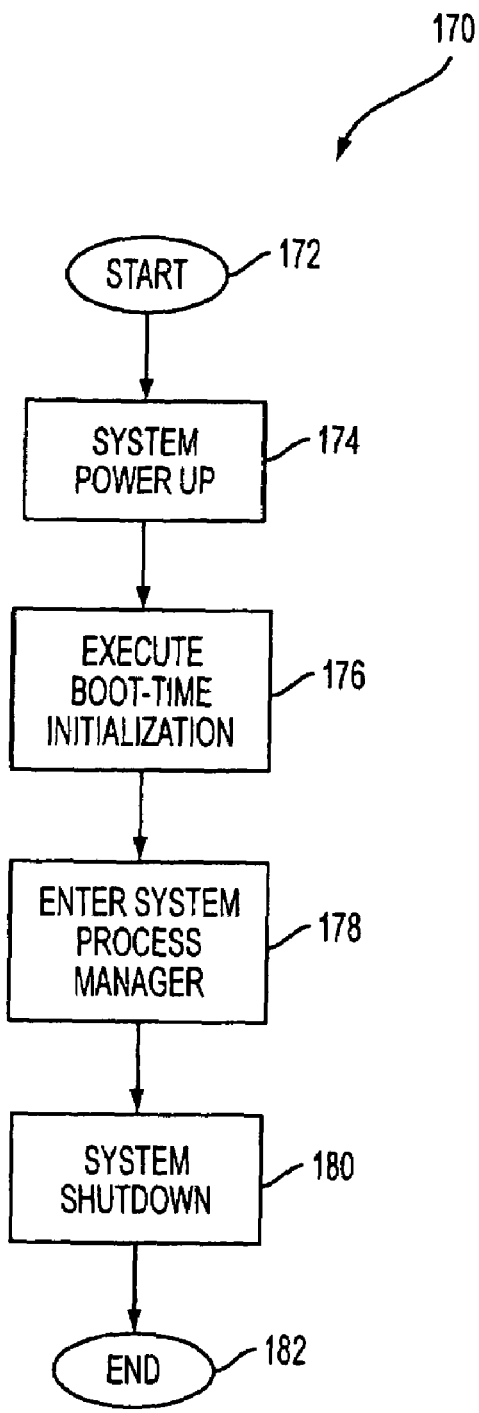
FIG. 5 is a flow-diagram illustrating a process of providing the virtual machine functionality on the World Wide Web.

FIG. 5 illustrates the operation of a host computer system with the extension 148 installed. More particularly, a process 170 in accordance with the present invention begins at 172 and, in a step 174, the computer system (such as system 14 in this example) is "powered up." Next, in a step 176, boot-time initialization occur wherein resources are allocated and various extensions, patches, libraries, etc. are loaded into the operating system. Next, in a step 178, the system process manager is entered. It is during the step 178 that the process of the present invention is implemented by a user of the computer system. Finally, in step 180, there is a system shut down wherein the resources are de-allocated and files are closed in a systematic matter. The process 170 is completed at 182.

Figure 6:
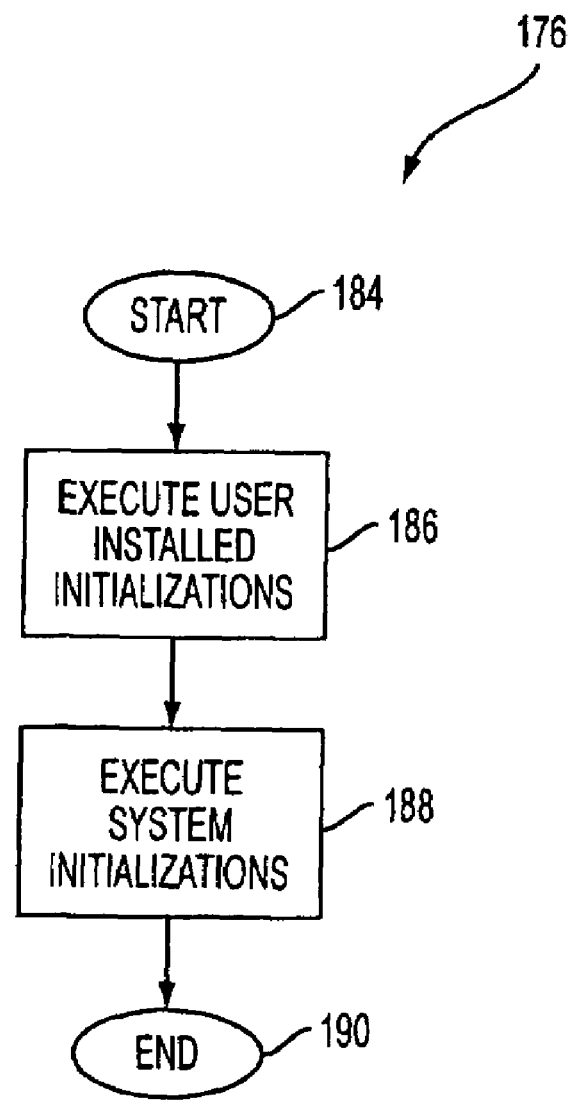
FIG. 6 is flow-diagram illustrating the "Execute Boot-Time Initialization" step of FIG. 5 in greater detail.

In FIG. 6, step 176 of FIG. 5 is illustrated in greater detail. More particularly, process 176 begins at 184 and, in a step 186, the user installed initializations (such as the extension 148) are installed to the operating system. Next, in a step 188, the system initialization are executed. The process 176 is then completed at 190.

Figure 7:
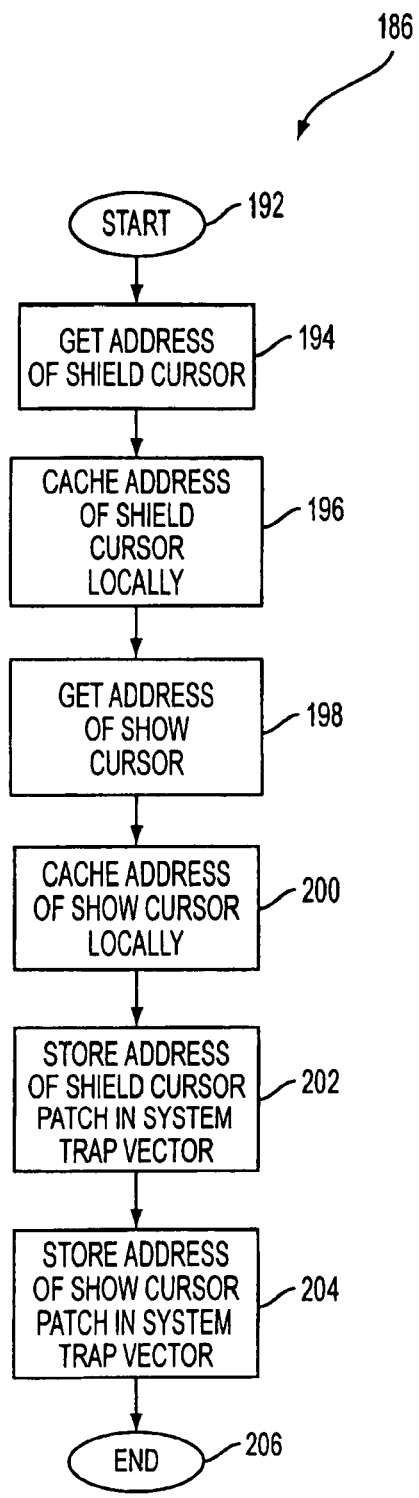
FIG. 7 is a flow-diagram illustrating the "Execute User Installed Initialization" step of FIG. 6.

In FIG. 7, the step "Execute User Install Initialization" of FIG. 6 is described in greater detail. More particularly, process 186 begins at 192 and, in a step 194, the address of the "shield cursor" function is obtained. Next, in a step 196, the address of the shield cursor function is stored locally, e.g. is stored on the hard disk of computer system 14. Next, in a step 198, the address of the "show cursor" function is obtained. The address of the show cursor function is then stored locally as indicated in step 200. Next, the address of the shield cursor patch is stored in the system trap vector in a step 204, and the address of the show cursor patch is stored in the system trap vector in a step 204. The process is completed at 206.

The process 186 is an illustration of the installation of one of the extensions, such as the extension 148. There are likely other extensions that are also being installed in a step 186. The installation of extensions into operating systems, such as the Macintosh operating system, is known to those skilled in the art and is fully disclosed in the multi-volume reference set, *Inside Macintosh*, by C. Rose et al., Addison-Wesley Publishing Company, Inc., July 1988 et. seq., the entire set of which is incorporated herein by reference.

One purpose of the extension 148 installed by process 186 is to "patch" the system such that calls for "shield cursor" and "show cursor" are intercepted and modified. This allows the patch of the present invention to determine when and how the visual output of the host computer is being modified. The operation of the trap vector, the shield cursor, and the show cursor are well known to those skilled in the art. These processes are extensively documented in the aforementioned multi-volume reference set, *Inside Macintosh*, supra.

Figure 8:
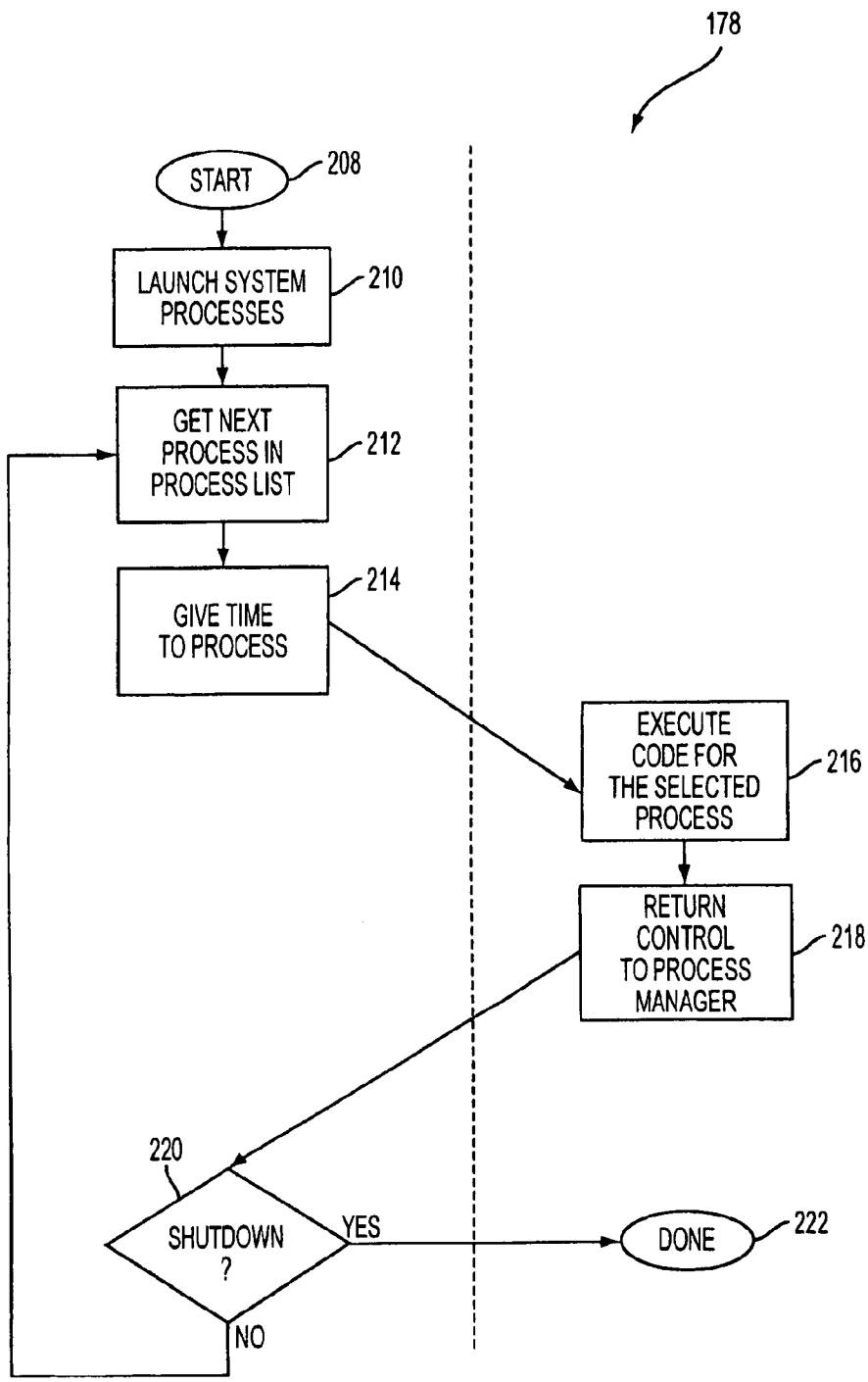
FIG. 8 is a flow-diagram of the "Enter System Process Manager" step of FIG. 5.

In FIG. 8, step 178 of FIG. 5 is described in greater detail. The process 178 is the main operating process of the computer system, such as computer system 14. The vertical broken line in FIG. 8 conceptually separates the process manager ("operating system") from the process being executed. The process manager is to the left of the broken line, and the process is to the right of the broken line. The process 178 begins at 208 and, in a step 210, the system processes are launched. For example, in the Macintosh computer system, the "finder" is one of the first system processes to be launched. The user, such as Mary, can then launch additional processes within the finder process itself.

The process 178 continues with the step 212 wherein the next process in the process list is obtained. A step 214 provides that next process time to execute, by jumping to a step 216. In the step 216, code for the selected process is executed on the computer system. In a step 218, control of the computer system is returned to the process manager and a step 220 determines if a shut down of the computer system has been requested. If not, process control is returned to step 212 to obtain the next process in the process list. If shut down is indicated, the process 178 is completed as indicated at 222.

Figure 9:
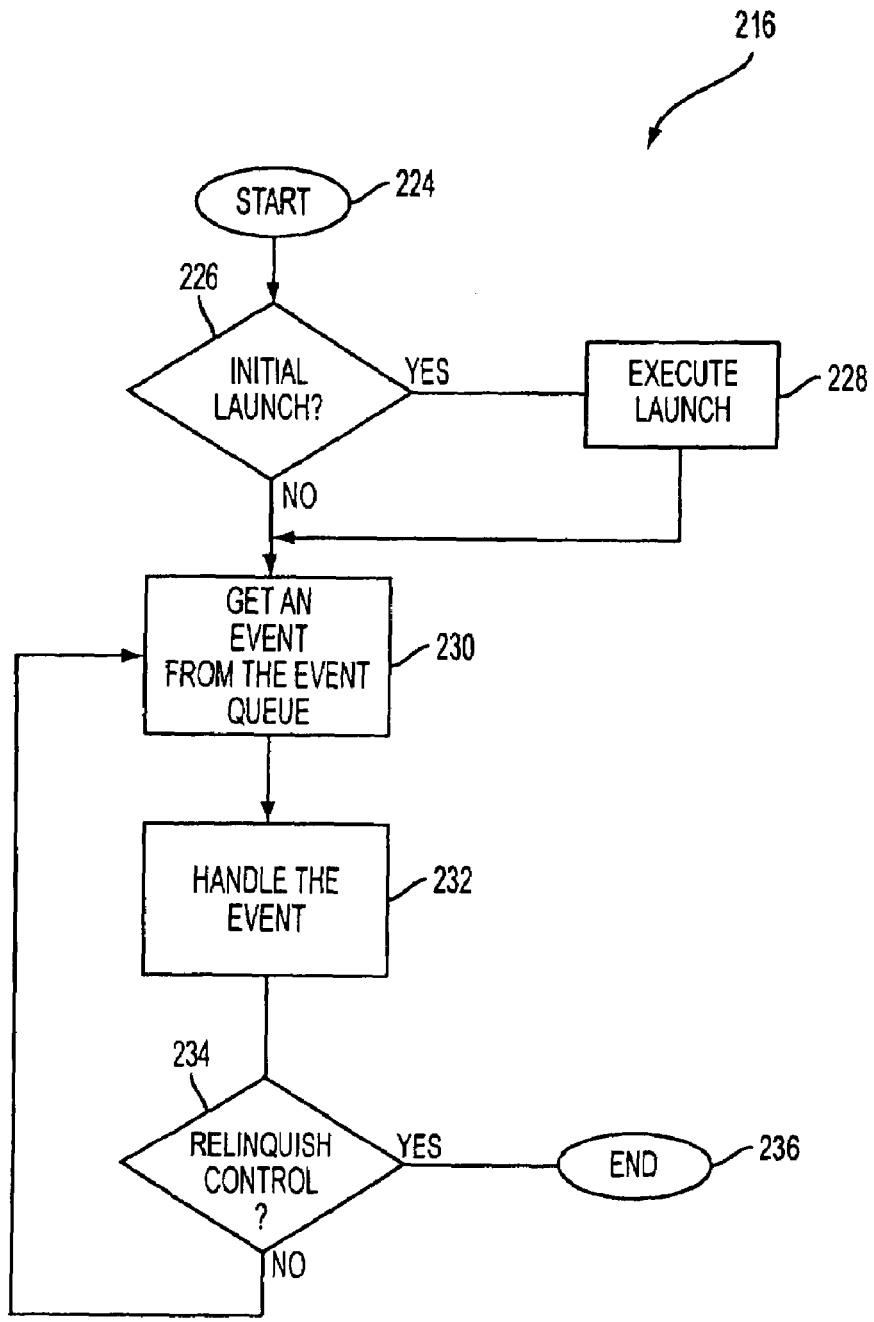
FIG. 9 is a flow-diagram of the "Execute Code For The Selected Process" step of FIG. 8.

In FIG. 9, step 216 "Execute Code for the Selected Process" of FIG. 8 is described in greater detail. Process 216 begins at 224 and, in a step 226, it is determined whether the process is just being launched. If yes, the launch is executed in a step 228. If this is not an initial launch of the process, or after the launch, as indicated by step 228, a step 230 retrieves an event from the event queue. Next, in a step 232, the event is handled, as described in *Inside Macintosh*, supra. A decision step 234 determines whether control should be relinquished. If not, another event is retrieved from the event queue in step 230. If control is to be relinquished as determined by step 234, the process is completed at 236.

It should be noted that the process 216 is generic to all of the multiple processes that may be running on the computer system at any one time. Therefore, this process can include general application program processes, as well as the virtual machine process of the present invention for providing a "virtual machine" on the Internet.

Figure 10:
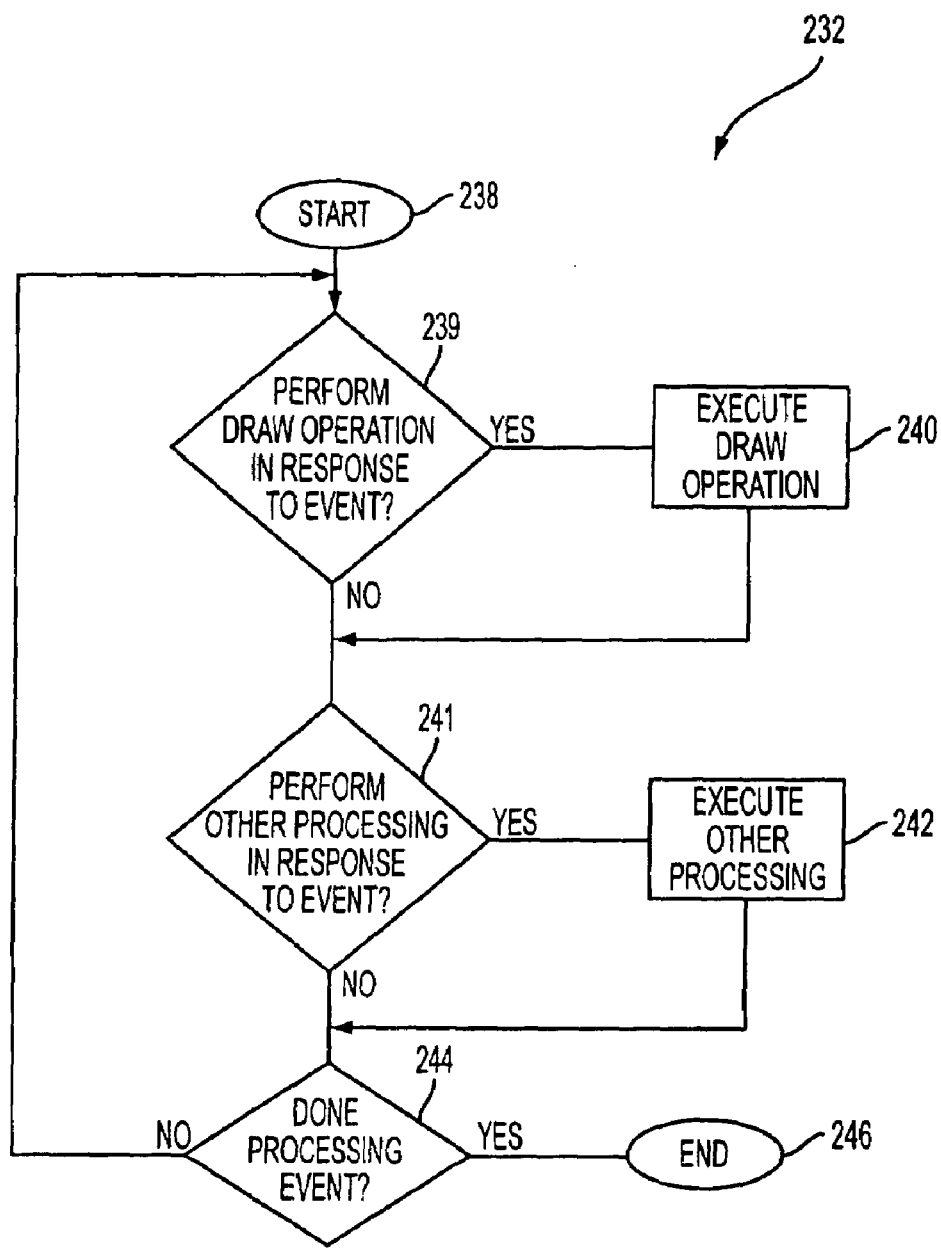
FIG. 10 illustrates the "Handle The Event" step of FIG. 9.

In FIG. 10, the step 232 "Handle the Event" of FIG. 9 is illustrated in greater detail. Process 232 begins at 238, and in a step 240, a "draw" operation is executed. Again, there is discussion of the "draw" operation in *Inside Macintosh*, supra. Next, in a decision step 242, it is determined whether there is any more drawing to be done. If yes, process control is returned to step 240. If not, other operations are performed in response to the event in a step 244. The process 232 is completed at 246.

The "Handle the Event" process 232 is designed to detect and intercept changes made to the video display (monitor) of the host computer system. As will be discussed in greater detail subsequently, this "Execute a Draw Operation" step 240 includes processes for detecting the draw operation and for passing on this draw operation to the client computer, over the Internet. This permits a client computer to display on its own monitor the results of the draw operation in its "virtual machine" window.

It should be noted at this point that while the preferred method for updating the screen of a local computer with changes made to the host computer display is as described, that there are other alternatives and equivalents to this process. For example, the video buffer of a host computer can be captured at regular intervals, e.g. every one-half second, and then sent over the Internet to the client computer. However, this would create delays in response at the client computer if the client computer was providing inputs to the host computer. For example, if the client was typing on the keyboard of the client computer, there would be an appreciable lag before the results of the typing into the "virtual computer" would be displayed. If, however, the local computer was simply being used to monitor (i.e. "eavesdrop on") the host machine, the up to one-half second delay would not be detrimental.

Figure 11:
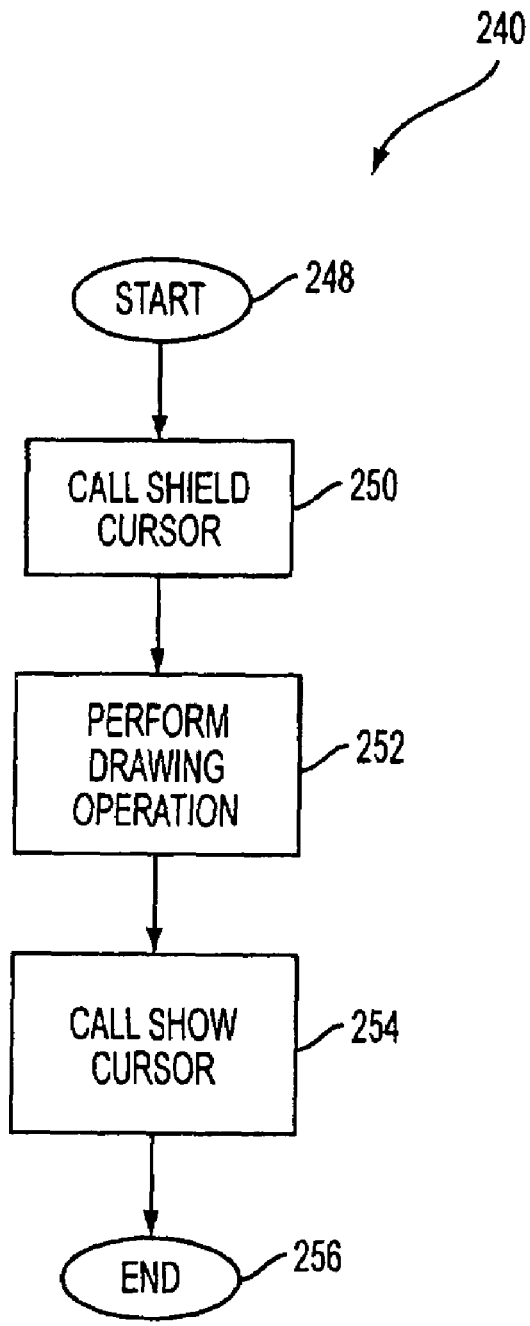
FIG. 11 is a flow-diagram illustrating one example of the "Execute A Draw Operation" step of FIG. 10.

One example of the step 240 "Execute a Draw Operation" of FIG. 10 is illustrated in FIG. 11. It should be noted that the "shield cursor" and "show cursor" system facilities have been patched by the extension 146 installed into the computer system by the process 186. Process 240 begins at 248 and, with a step 250, the shield cursor facility is called. Next, in a step 252, the drawing operation is performed. In a step 254, the show cursor routine is called, and the process is completed at 256.

Figure 12:
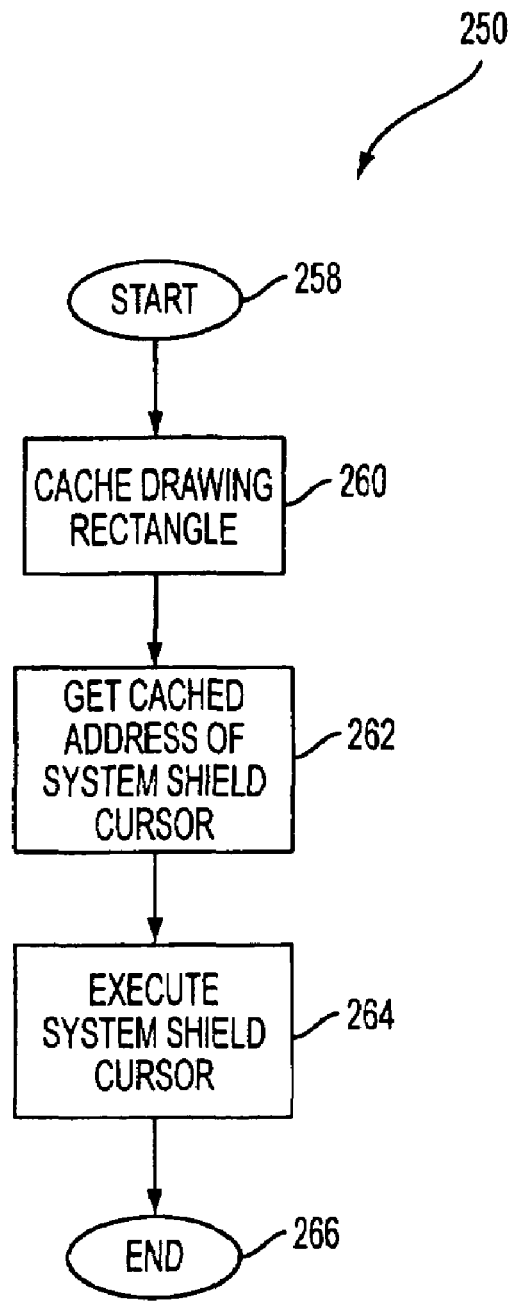
FIG. 12 is a flow-diagram illustrating the "Call Shield Cursor" step of FIG. 11.

In FIG. 12, the step 250 "Call Shield Cursor" of FIG. 11 is described in greater detail. The process 250 begins at 258 and, in a step 260, the drawing rectangle is "cached" (i.e. stored) on the computer system. Next, in a step 262, the cache address of the system shield cursor is obtained. A step 264 executes the system shield cursor facility, and the process is completed at 266.

It will be appreciated that the process 250 patches into the systems "shield cursor" facility to obtain certain information used to provide a "virtual machine" over the Internet. As noted previously, there are other ways of obtaining this information. The process 250 is a convenient and timely method for obtaining the information concerning the change of the display on the computer system video display for rapid transmission of the information over the Internet to a client machine.

Figure 13:
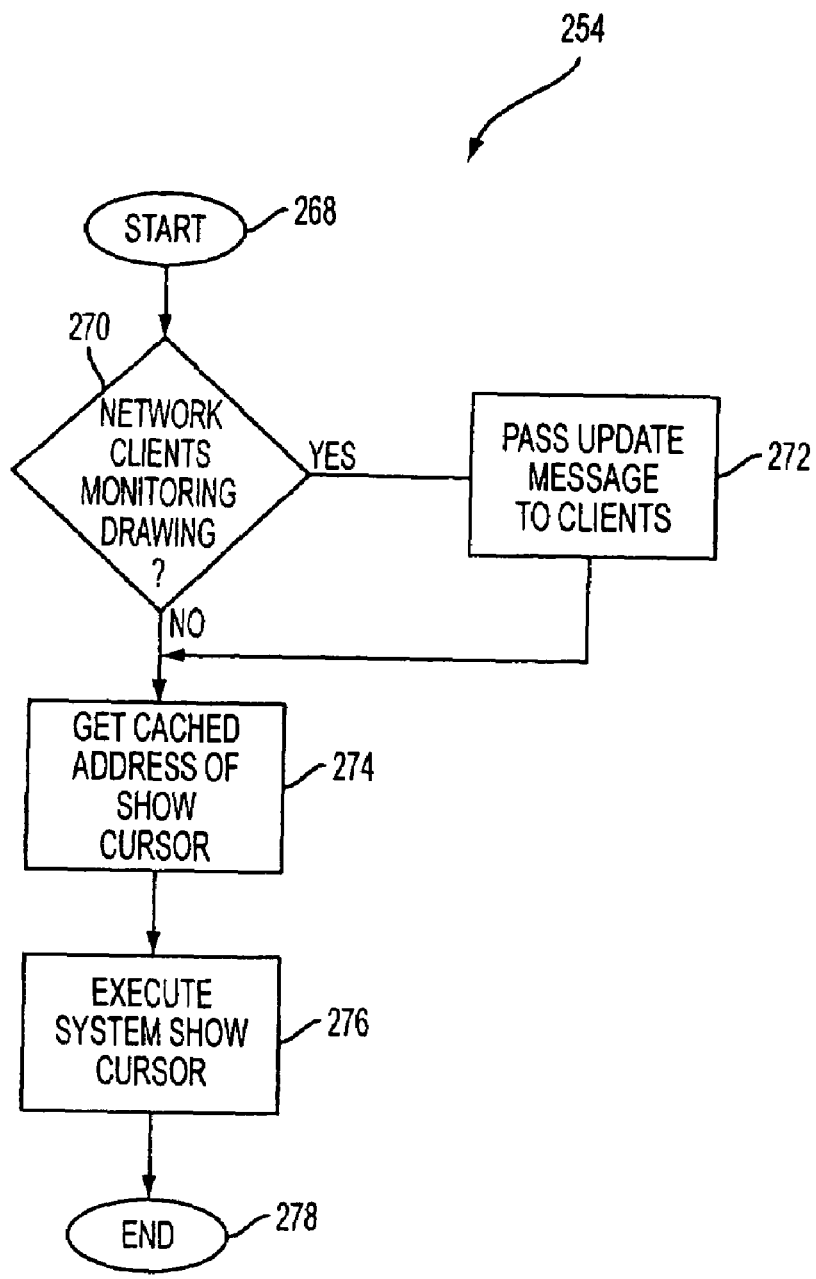
FIG. 13 is a flow-diagram illustrating the "Call Show Cursor" step of FIG. 11.

In FIG. 13, the step 254 is illustrated in greater detail. The process "call show cursor" begins at 268 and, in a decision step 270, it is determined whether any network (i.e. Internet) clients are monitoring the drawings. If yes, a step 272 passes update messages to the clients so that they can update the video display of the client computer. If no network clients are monitoring the drawing or after the execution of step 272, the cache address of the show cursor is obtained in step 274. Then the system show cursor function is executed in a step 276, and the process is completed at 278.

Once again, the system function "show cursor" has been patched such that if any changes to the drawings have occurred, these changes can be passed on to the client computers over the Internet. In addition, the process has a cache rectangle which indicates where in the screen the changes occur, meaning that only that portion of the screen where changes occurred needs to be sent over the Internet. This is an attractive feature of the present invention, in that the entire screen does not have to sent over the Internet (which could be a slow operation), but only changed portions of the screen need to be sent over the Internet. The actual image is taken from the video buffer of the host computer within the range specified by the rectangle. Preferably, the bit mapped (or pixel mapped) image taken from the video buffer is compressed, using a suitable and preferably standard compression technique such as MPEG, before transmission over the Internet.

Figure 14:
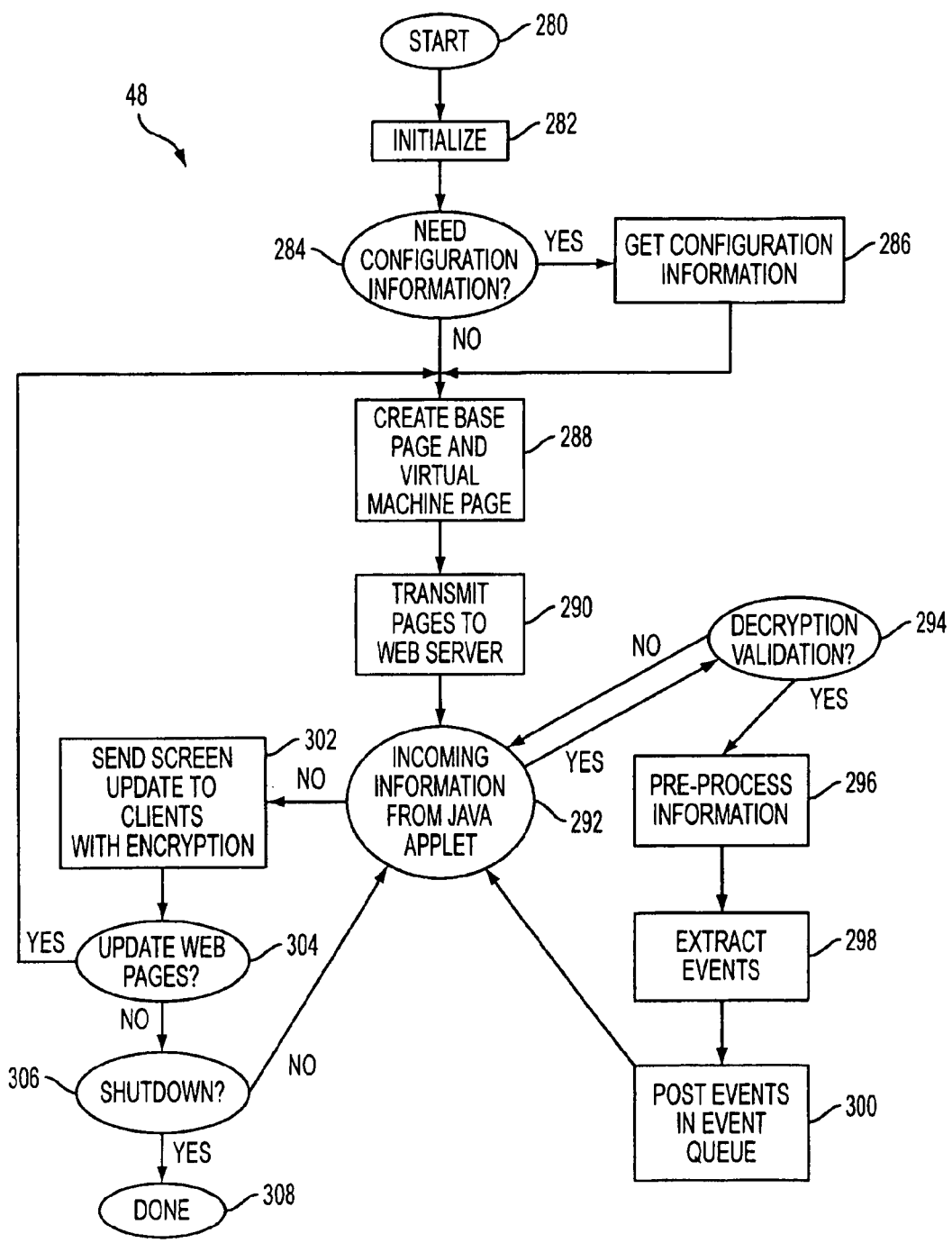
FIG. 14 illustrates the process implemented by the virtual machine application program of FIG. 2.

In FIG. 14, the virtual machine application 48 of FIG. 2 is illustrated in greater detail. The process 48 is an application program running on the computer system, e.g. on a Macintosh computer system, on a WINTEL computer system, on a workstation, etc. The process 48 begins at 280 and, in a step 282, the application program is initialized; the code of the application is loaded into memory, and internal data structures are initialized. Next, in a step 284, it is determined whether the process 48 needs configuration information. If so, the configuration information is obtained in a step 286. Once the process 48 has the necessary configuration information, a step 288 creates a base page and a virtual machine page. Next, in a step 290, the base page and the virtual machine page are transmitted to the web server 20 over the Internet 12.

The decision step 292 determines whether there is incoming information from a Java Applet. If there is, a decision step 294 determines whether there is a decryption validation. If not, step 294 returns process control to step 292. If there is decryption validation, a step 296 pre-processes the information. A step 298 then extracts the events from the information, and then events are posted into the event queue of the host computer system (such as computer system 14) in a step 300.

If there is no incoming information from a Java Applet as determined by step 292, a step 302 will send screen updates to the client with the proper encryption. A step 304 then determines whether the web pages should be updated, preferably by checking if a fixed period of time has elapsed since the last update. If the web pages are to updated, process control is returned to step 288 to create new base page and virtual machine pages. If the web pages are not to be updated, a decision step 308 determines whether shut-down of the host computer system is desired. If not, process control is returned to step 292, and if shut-down is desired, the process 48 is complete as indicated at 308.

Figure 15:
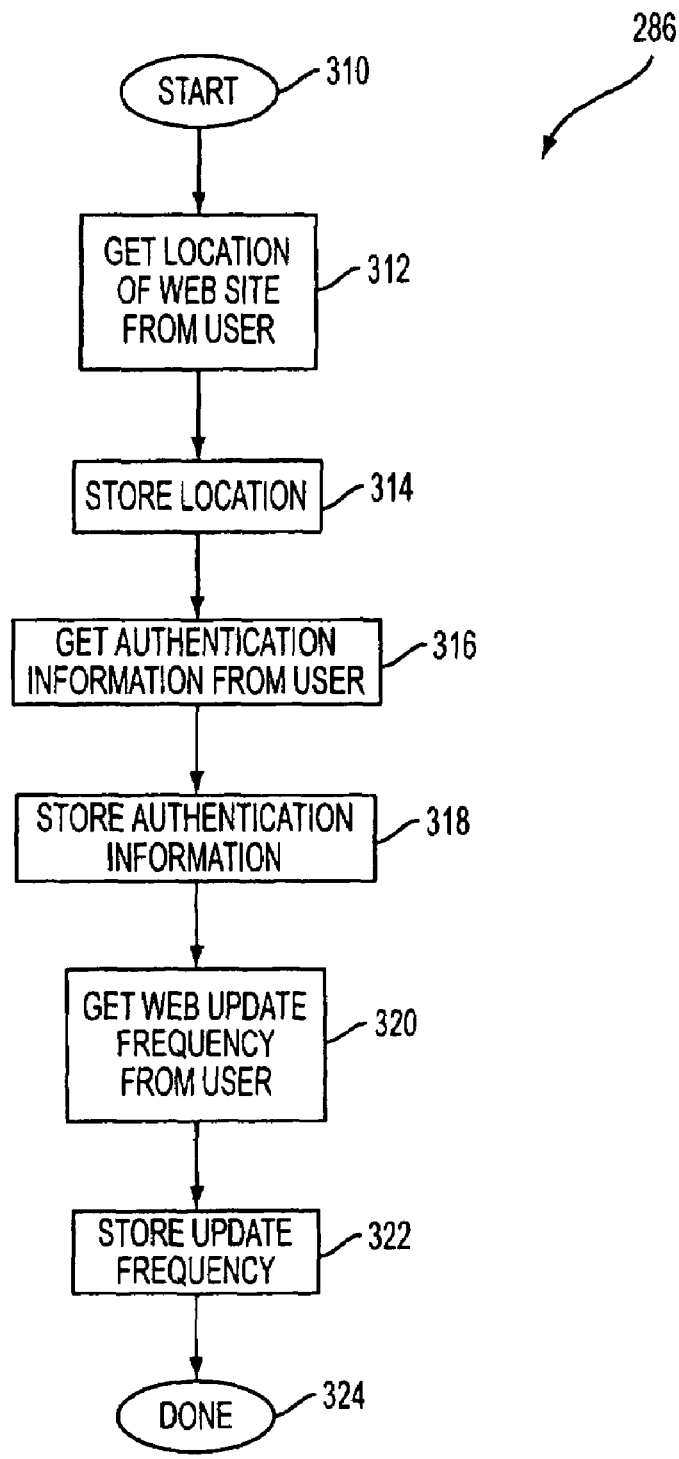
FIG. 15 illustrates the "Get Configuration Information" step of FIG. 14.

In FIG. 15, the process 286 "Get Configuration Information" of FIG. 14 is illustrated in greater detail. Process 286 begins at 310 and, in a step 312, the location of the web site is obtained from the user. This web site location is an address on the World Wide Web that is supported by the web server 20. Next, in a step 314, the location of the web site is stored. A step 316 retrieves authentication information from the user, which is stored in a step 318. Next, in a step 320, the web update frequency is received from the user, and the update frequency is stored in a step 322. The process is then completed at 324.

Figure 16:
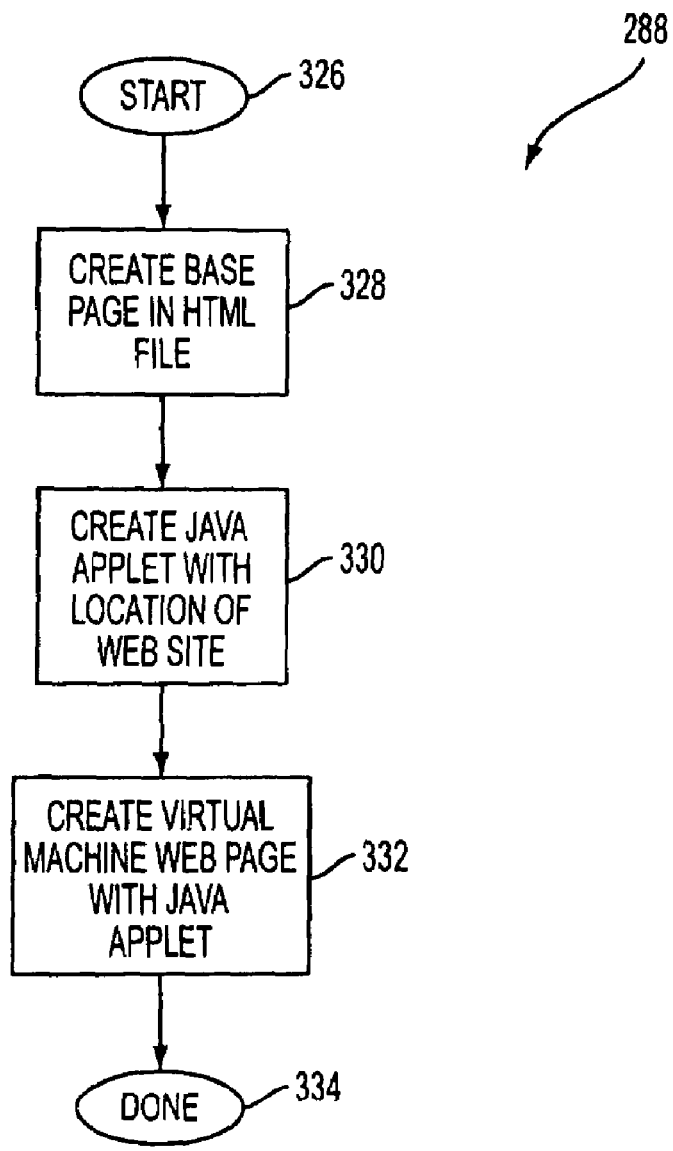
FIG. 16 illustrates the "Create Base Page and Virtual Machine Page" step of FIG. 14 in greater detail.

In FIG. 16, the step 288 "Create Base Page and Virtual Machine Page" is disclosed in greater detail. More particularly, process 288 begins at 326 and, in a step 328, a base page HTML file is created. The creation of web pages with HTML file is well known to those skilled in the art, and there a variety of utilities available on the commercial market for the creation of pages with HTML files. Next, in a step 330, a Java Applet with the location of the web site is made available. In other words, a Java Applet script of FIG. 2 is created, modified, or used in its stored form. Finally, in a step 332, a virtual machine web page with the Java Applet is created. The process is then completed at 324.

Figure 17:
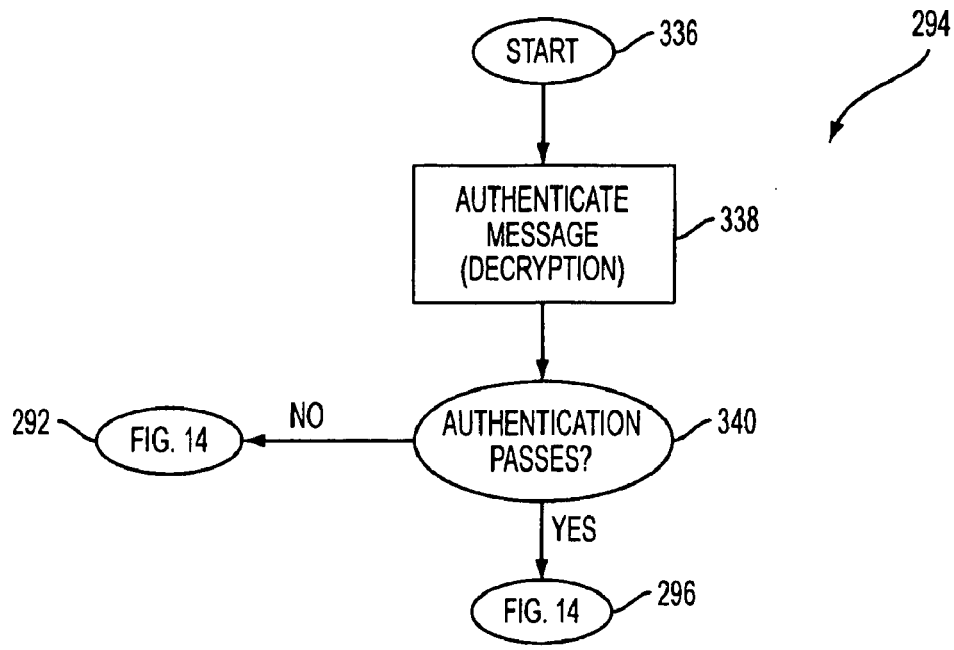
FIG. 17 illustrates the "Decryption Validation?" step of FIG. 14.

In FIG. 17, the step 294 "Decryption Validation" of FIG. 14 is illustrated in greater detail. A process 294 begins at 336 and, in a step 338, the message is "authenticated." This authentication involves the decryption of the message using a supplied password. A step 340 then determines whether the authentication passes and, if so, process control is turned over to step 296 of FIG. 14. If authentication does not pass, process control is turned over to step 292 of FIG. 14.

Figure 18:
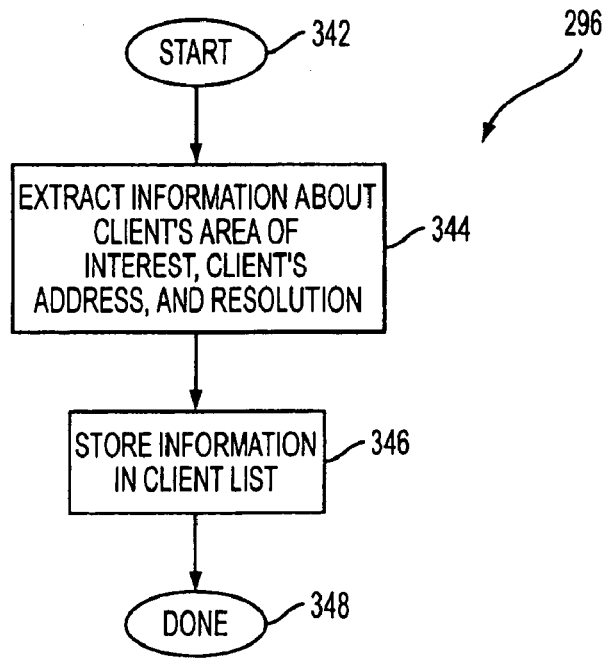
FIG. 18 illustrates the "Pre-Process Information" step of FIG. 14.

In FIG. 18, the step 296 "Pre-Process Information" of FIG. 14 is illustrated in greater detail. The process 296 begins at 342, and a step 344 extracts information about the client's area of interest, the client's address, and the resolution of the client computer screen. This information is stored in a client list step 346, and the process is completed at 348. The client list can include multiple clients, each of which will have information concerning their areas of interest, their Internet address, and their screen resolution.

Figure 19:
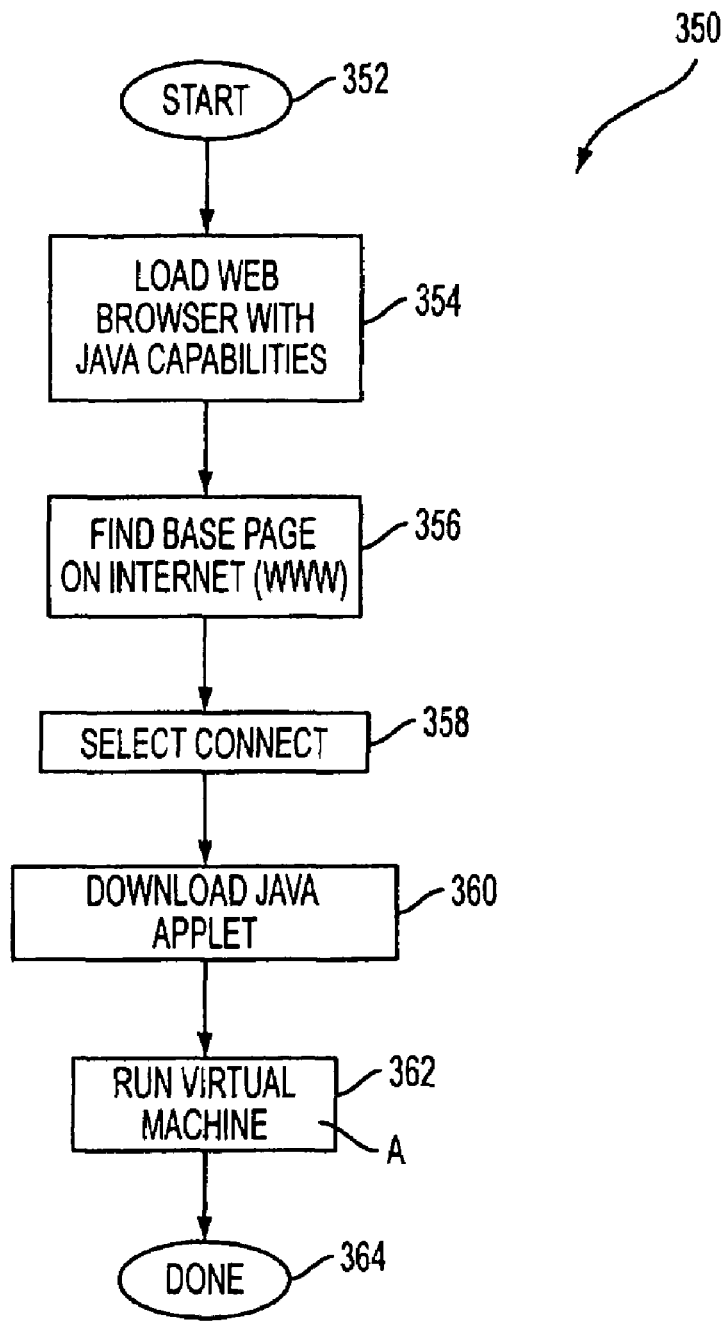
FIG. 19 illustrates a process of the present invention implemented on a client machine of the system of FIG. 1.

In FIG. 19, a process 350 for running on a client machine (such as computer system 18) is disclosed. This client process can be implemented completely in commercially available software, and is described herein for the sake of completeness. The process 350 begins at 352 and, in a step 354, a web browser with Java capabilities is loaded. As noted previously, the Netscape web browser with Java is suitable for use of the present invention. Next, in a step 356, a base page is found on the Internet World Wide Web (WWW). This is accomplished by using the navigation functions of the web browser. Next, in a step 358, the client selects the "connect" option of the base page of the present invention, and in a step 360, a Java Applet is downloaded to the client system. A step 362 then runs the "virtual machine," which essentially is running the host computer system while displaying the video and other outputs on the client computer system, with inputs to the client computer system being transmitted to the host computer system. The process is then completed at 364.

Figure 20:
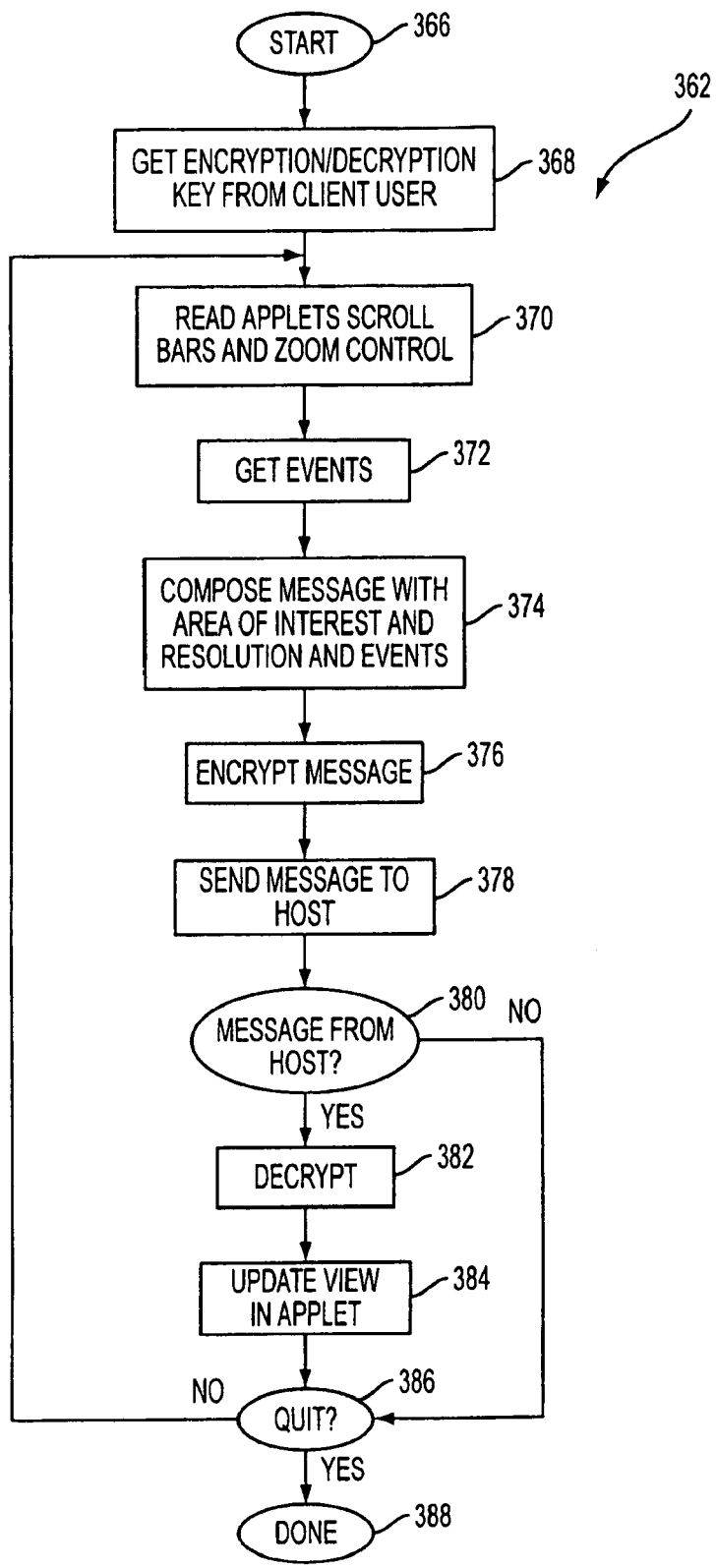
FIG. 20 illustrates the "Run Virtual Machine" step of FIG. 19.

The step 362 "Run Virtual Machine" of FIG. 19 is illustrated in greater detail in FIG. 20. Process 362 begins at 366 and, in a step 368, the encryption/decryption key ("password", "keyword", etc.) is obtained from the client user. Next, in a step 370, the Applet's virtual machine window's scroll bars and zoom control are read. A step 372 gathers events from the client user. Next, in a step 374, a message is composed with an area of interest in the client computer screen (i.e. in the client computer's video frame buffer), along with the appropriate resolution and events. The composed message is the encrypted in a step 376, and is sent to the host in a step 378.

A decision step 380 determines if there is a message from the host. If there is, the message is decrypted in a step 382, and then the Applet controlled virtual machine window is updated in a step 384. If there is no message from the host, or after updating the virtual machine window, it is determined in a step 386 if the process 362 is to be terminated. If not, process control is returned to step 370. If the process 362 is determined to be terminated in a step 386, the process is completed at 388.

Figure 21:
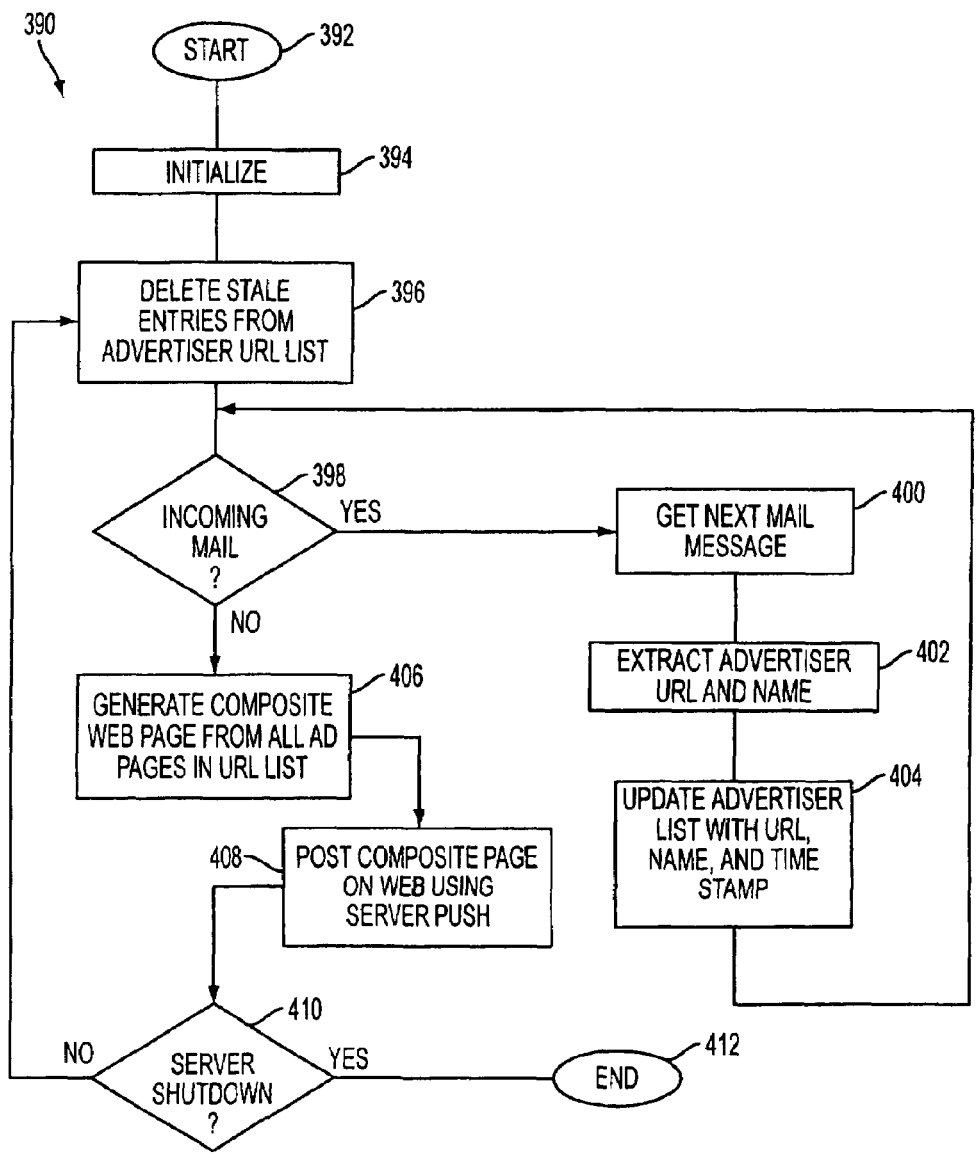
FIG. 21 illustrates a process of the present invention running on a web server of FIG. 1.

In FIG. 21, an optional process 390 that can run on the web server 20 is disclosed. In this process, the web server at the web site can consolidate and manage a number of virtual machines that are either part of the Internet 12, or which are connected to Internet 12. In this scenario, the host machine (such as computer 14) can be considered to be an "advertiser" of a potential "virtual machine" and the web server (such as web server 20) can be considered to be the "advertisement publisher" or "ad publisher." The client machine (such as machine 18) is simply a "web user" who browses through the advertisements of the ad publisher and selects a virtual machine.

Process 390 begins at 392 and, in a step 394, the system is initialized; code is loaded into memory and internal data structures are initialized. Next, in a step 396, "stale entries" from the advertiser URL list are removed. As it is well-known to those skilled in the art, the URL is simply the address of a web page on the Internet. By "stale entries," it is simply meant that the content of the advertiser URL list is periodically updated. A local copy of the latest version of each "advertisement" is kept and compared to the advertisement on the web. If they are identical for too long of a period, the advertisement is considered to be "stale" and is deleted from the advertisement list.

Next, in a decision step 398, it is determined if there is any incoming mail. If there is, a step 400 receives the next mail message and a step 402 extracts the advertiser URL and name. Next, in a step 404, the advertiser list is updated with the URL, name, and time stamp, and process control is returned to step 398. If there is no incoming mail, a step 406 generates a composite web page from all advertisement pages in the URL list. Next, in a step 408, the composite web page is posted on the web using a sever push. Next, in a decision step 410, it is determined whether the server is to be shut down. If not, process control is returned to step 396. If the server is to be shut down, the process 390 ends at 412.

Figure 22A:
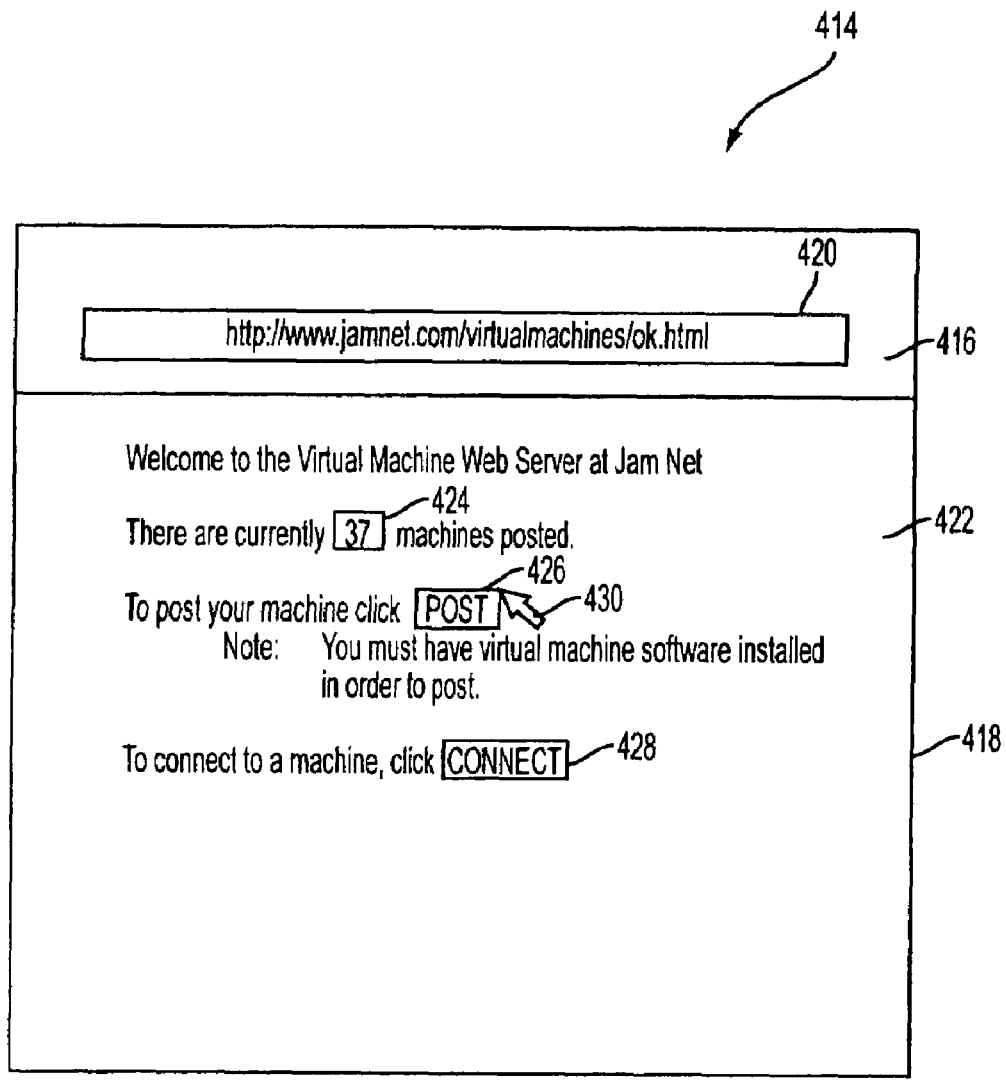
FIG. 22a illustrates an advertiser home page supported by the web server of FIG. 1.

In FIG. 22a, an "home" web page 414 created at an advertiser web site (e.g. by process 390 running on a web server) is disclosed. The web "base" or "home" web page includes a header 416 and a body portion 418. In this instance, the header includes the address or "URL" of the web page 418 which, in this example, is as follows:

http://www.jamnet.com/virtualmachines/ok.htm

The use of web browsers (such as the aforementioned Netscape™ web browser) to access web pages such as web page 414 on the screen of a user's computer is well known to those skilled in the art.

In the body portion 418 of web page 414 there is a brief welcome 422 to the "virtual machine web server" at the web site "jamnet." A window 424 displays the current number of machines that are "posted" at this web site. The body 418 also includes two buttons 426 and 428. By "clicking" on button 426, a user can "post" a virtual machine on the web site. By "clicking" on the button 428, a user can select a virtual machine from the web site to monitor and/or interact with.

As it is well known to those skilled in the art, the terms "click," "select," and the like refer to the act of using a pointer mechanism, such as a mouse 30 (see FIG. 1), to position a pointer icon, such as a pointer icon 430, on a computer screen, and then activating ("clicking") a button of the mouse to cause an action at the location pointed to by the pointer icon 430. For example, "clicking" on the screen of a computer can press a button, open a file, activate a program, draw a line, etc. By "post" or "posting", it is meant that a computer implemented process is executed which causes a host machine coupled to the Internet to become available as a "virtual machine." The "virtual machine" refers to the fact that it appears that a fully functional computer is available on the Internet when, in fact, the actual computer may be a computer connected to the Internet through a WAN server. However, the virtual machine may also be a WAN server which is providing its computing functionality to the Internet via the "virtual machine" protocol.

Figure 22B:
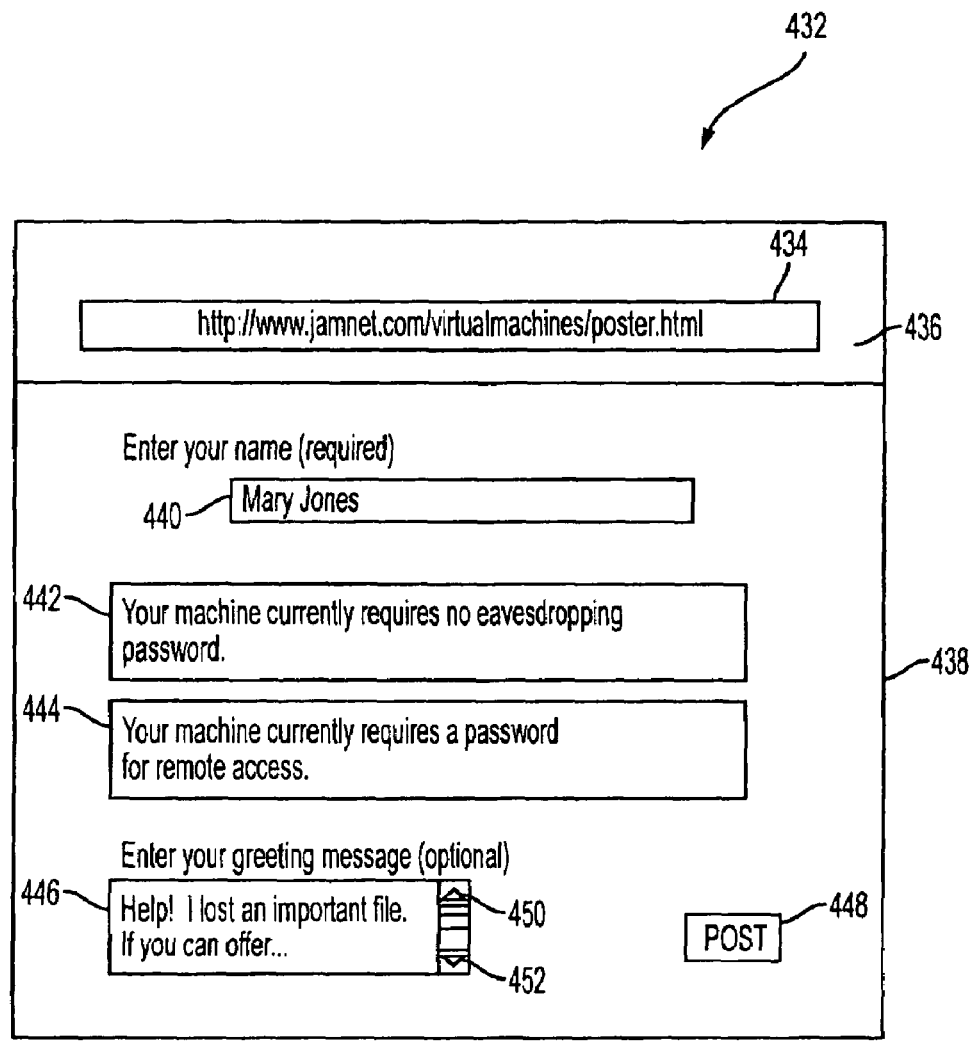
FIG. 22b illustrates an advertiser posting page that is connected via hyper-links to the web page of FIG. 22a and which is accessed when host wishes to post a "virtual machine" onto the World Wide Web.

With reference to FIG. 22b, assume that the pointer icon 430 of FIG. 22a was used to "click" (i.e. "push" or "select") the button 426 of FIG. 22a to cause the display of another web page 432. As it is well known to those skilled in the art, this is accomplished by making a "hyperlink" between the "post" button 426 and the web page 432. This hyperlink provides the URL 434 of the web page 432, which is often on the same web server 20, but which can be on any other web server 22 on the Internet 12, or on any computer connected to the Internet. The URL 434 of web page 432 is, in this instance:

http://www/jamnet/com/virtualmachines/poster.html

The web page 432 again includes a header 436 and a body portion 438. The header 436 includes the URL of the web page and the body portion 438 includes four windows 440, 442, 444, and 446, and a button 448. In window 440, the advertisers (i.e. host computers) can post their user's or sponsor's name. Assume, for the purpose of this example, that the user of computer system 14 is "Mary Jones." As the user, Mary Jones enters her name into window 440. This is typically accomplished by using the mouse 30 to position a cursor within the window 440, and then using the keyboard 28 to type in the name. Alternatively, the keyboard alone can be used using tab keys, cursor positioning keys, etc. to properly position a cursor in the window 440 prior to typing in her name. This form of keyboard/pointer input is well known to those skilled in the art.

The windows 442 and 444 are preferably Java™ windows controlled by Java software provided by Sun Microsystems, Inc. of Mountain View, Calif. These windows 442 and 442 are controlled by Applets™ produced in the Java programming language. The use of Java and Applets is well known to those skilled in the art and is described, for example, in *Hooked on Java, Creating Hot Web Sites with Java Applets*, Arthur van Hoff, Sami Shaio, and Orca Starbuck of Sun Microsystems, Inc., Addison-Wesley Publishing Company, 1996, the disclosure of which is incorporated herein by reference.

The window 442 displays the output of a Java Applet provides the current access mode for "eavesdropping" or "monitoring" the advertiser computer system 14. As noted in window 442, Mary's machine currently does not require a password for another system connected to the Internet 12 to monitor her system's (i.e. computer 14's) outputs. In window 444, it is indicated that Mary's machine 14 currently requires a password for "remote access", i.e. a password is required before Mary's computer system 14 can be controlled over the Internet 12.

In window 446, a space is provided for entering a greeting message. As noted, the window 446 includes scroll buttons 450 and 452 to allow a longer message than would otherwise fit in window 446. In this instance, Mary Jones is indicating that she lost an important file and is posting her machine on the Internet and in hope that someone can help retrieve the file.

Figure 22C:
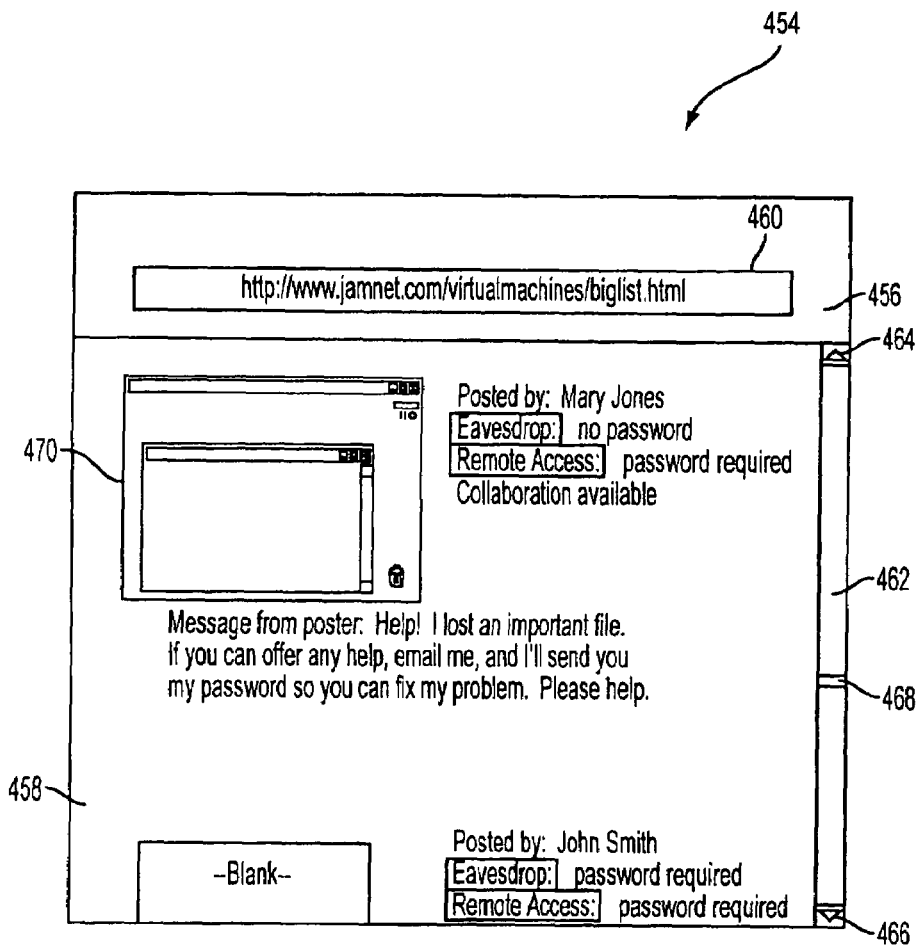
FIG. 22c is an advertiser listing page supported by the web server of FIG. 1 that is connected via hyper-links to the web page of FIG. 22a so that client computers can access virtual machines posted on the World Wide Web.

In FIG. 22c, a web page 454 is accessed when a user-client clicked on button 428 of the web page 414 of FIG. 22a. This web page 454 allows the connection of a user's machine to a "virtual machine" that has been posted on the Internet 12. The web page 454 includes a header 456 and a body portion 458. The header 456 includes the URL 460 of the web page 454, and the body portion 458 includes one or more "virtual machines", as defined previously. In this instance, the URL 460 is:

http://www.jamnet.com/virtualmachines/biglist.html

A scroll bar 462 includes scroll buttons 464 and 466 and a place marker 468 which allows a user-client to quickly navigate through the body portion 458 to find a desired virtual machine. By the centralized position of the place marker 468, it can be inferred that Mary Jones' virtual machine is somewhere in the middle of a "big list" which might include tens or even hundreds of virtual machines, each representing a computer system posted to the web page.

Again, by "virtual machine," it is meant that the functionality of a computer system, such as computer system 14, can be accessed by another computer system, such as computer system 18, in such a fashion that it appears that there is a "virtual" computer running in a window of computer system 18 from the Internet. Therefore, by "posting," i.e. "entering," a computer system 14 onto the Internet 18, a "host" computer is posting itself as a "virtual machine" for use by others, i.e. "clients." By accessing a "virtual machine" on the Internet, a user or "client" can operate and run the "virtual machine" from their own computer.

As seen in FIG. 22c, an image 470 of the display of Mary Jones' computer system 14 may be replicated (in a reduced form) in the body portion 458 of the web page 454. Also displayed is certain information about this virtual machine, such as the name of the person posting the machine, the requirements of passwords for eavesdropping or remote access, and whether collaboration is available or not. By "collaboration," it is meant that multiple clients can access a single host machine simultaneously. For example, if computer systems 16 and 18 both desire to access the virtual machine of computer system 14, this would be possible if collaboration were permitted. This functionality permits network-wide collaboration over the Internet 12. Alternatively, if the host machine is running a multi-processing system, multiple clients can simultaneously access processes on the host machine. For example, if the host machine is a personal computer running Windows NT™ from Microsoft Corporation of Redmond, Wash., each client ("web user") could occupy its own window, or some windows could be shared by multiple clients. Also displayed in the body portion 458 is the message from Mary Jones, which in this instance is "Help! I lost an important file. If you can offer any help, e-mail me and I'll send you my message so you can fix my problem. Please help."

If a computer system 12 which has become a client ("web user") of a host ("advertiser") machine 14, the display can be "clicked" or selected to indicate that they wish to become a client. The connection is then made through the Internet such that the client computer 18 can eavesdrop on ("monitor") or remotely access ("control") the host machine 14 through the Internet. In this instance, the "remote access" of the host machine 14 requires a password for Mary Jones. This is provided for security reasons and prevents the unauthorized uploading or downloading of program code and data without the password. For example, by eliminating remote access, Mary's computer system 14 is given a degree of protection against computer viruses, unauthorized uploading of computer files, etc.

Figure 23:
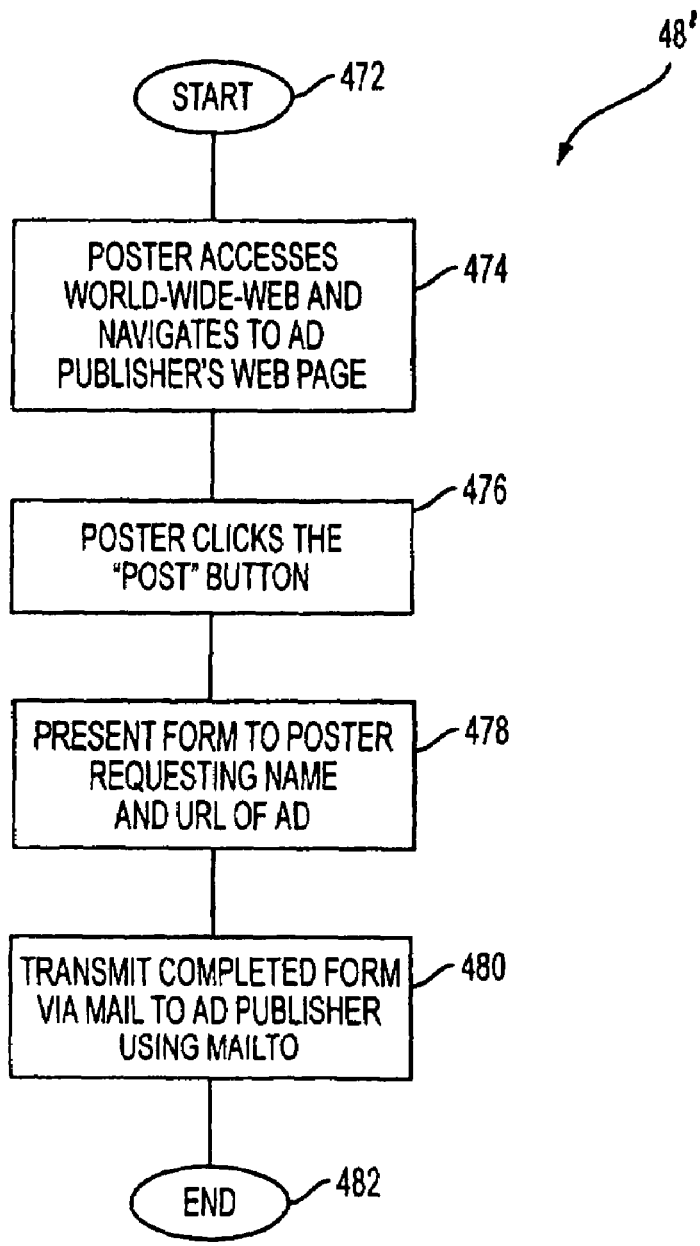
FIG. 23 is an additional process that can run on a browser installed on a host computer of FIG. 1 to communicate with an advertising publisher ("ad publisher")

In FIG. 23, an enhancement to the virtual machine application 48 is illustrated at 48'. This enhancement is used to interact with the web server software 390. More particularly, the process 48' begins at 472 and, in a step 474, the "poster" or "advertiser" or "host" accesses the World Wide Web (WWW) and navigates to an ad publisher ("web site manager") web site, i.e. step 474 navigates to the base or home page illustrated in FIG. 22a. Next, the poster clicks the host button 426 of FIG. 22a, and the page 432 of FIG. 22b is displayed. The name and URL of the advertiser is then determined. Next, in a step 480, the completed form is transmitted via e-mail over the Internet 12 to the ad publisher using the process "MAILTO." Both the request of the URL of the advertisement in step 78 and the transmission of mail to the ad publisher (using the MAILTO procedure) are standard features of HTML. The process is then completed at step 482.

Figure 24:
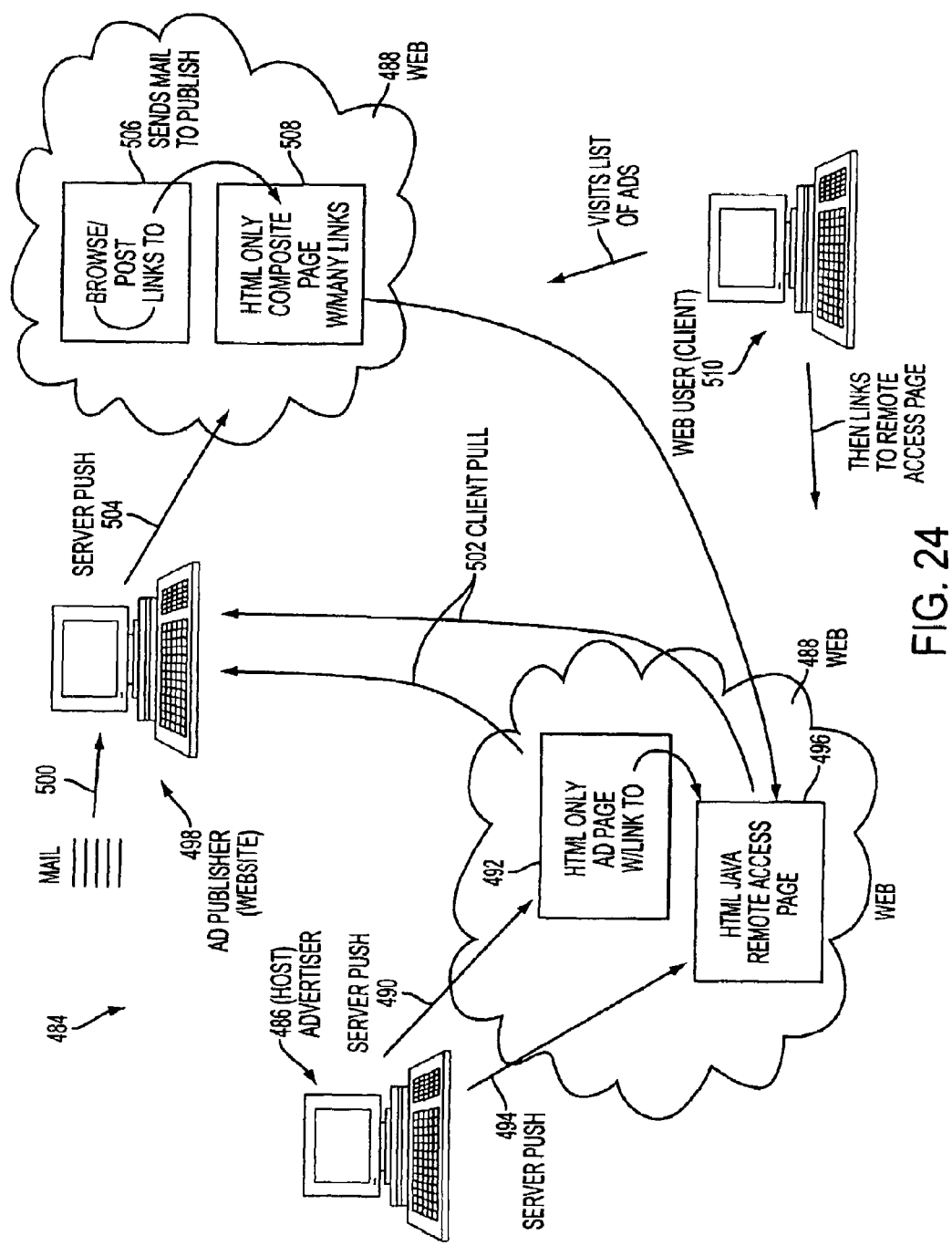
FIG. 24 illustrates the operation of a preferred embodiment of the present invention in a pictorial fashion.

The operation of the method and apparatus of a preferred embodiment of the present invention is illustrated in a pictorial fashion in FIG. 24. More particularly, the process 484 of the present invention begins with a host or advertiser 486 which makes two "server pushes" onto the Internet 488. A first server push 490 pushes the "HTML" advertisement page onto the Internet 488. A second server push 494 pushes the HTML with Java remote access page as a web page 496 onto the Internet 488. There is a hyperlink between the web page 492 and the web page 496, as explained previously. An advertisement publisher 498 (web server) receives mail 500 over the Internet and can also "pull" pages 492 and 496 into the web site, as indicated at 502. The ad publisher 498 can make a server push 504 into the World Wide Web 488 including a web page 506 which sends mail back to the ad publisher 498. The web page 506 is linked to an HTML only composite page 508 with many links to the HTML and Java remote access page 496 on the World Wide Web 488. A web user (client) visits the list of ads on the page 508 and then links to the appropriate access page, such as access page 496. The web user then becomes the client of the host/advertiser and runs a "virtual machine" over the World Wide Web 488.

While this invention has been described in terms of several preferred embodiments, there are alterations, permutations, and equivalents which fall within the scope of this invention. It should also be noted that there are may alternative ways of implementing both the process and apparatus of the present invention. For example, the described methods pertaining to the host computer are generally described in terms of a Macintosh computer system. It will therefore be apparent to those skilled in the art that when the host computer processes are implemented on other computer systems, such as MS-DOS, Microsoft Windows 95, and UNIX computer systems, that the methodology may require some modification. However, such modifications will become readily apparent to those skilled in the art after studying preceding descriptions and studying the drawings. It is therefore intended that the following appended claims be interpreted as including all such alterations, permutations, and equivalents as fall within the true spirit and scope of the present invention.

What is claimed is:

1. A system for accessing a computer over a TCP/IP protocol network comprising:

a plurality of host computers connected to a TCP/IP protocol network, each of said host computers being capable of being remotely controlled by a client computer;

an advertising publisher computer connected to said network which receives advertising information about at least the availability and capacity of said plurality of host computers on said network; and a client computer connected to said network operable to receive said advertising information about said plurality of computers from said publisher computer and to display said advertising information on a display of said client computer to allow a selection of a host computer among said plurality of host computers, and remote control information enabling said client computer to control a selected host computer over said network such that input events to said client computer become input events to said selected host computer and such that video output information of said selected host computer become video output information of said client computer;

wherein said advertising information for said selected host computer includes information about the poster of said host computer, password information for said host computer, and collaboration information for said host computer.

2. A system for accessing a computer over a TCP/IP protocol network as claimed in claim 1 wherein said network is the Internet.

3. A system for accessing a computer over a TCP/IP protocol network as claimed in claim 1 wherein said advertising publisher computer is operative to make advertising information about said plurality of host computers accessible to said client computer.

4. A system for accessing a computer over a TCP/IP protocol network as claimed in claim 3 wherein said advertising publisher computer creates a list of available host computers.

5. A system for accessing a computer over a TCP/IP protocol network as claimed in claim 4 wherein said advertising publisher computer provides said advertising information of said available host computers on a browsing web page, where a client computer may browse through said advertising information on said browsing web page and select a suitable host computer.

6. A system for accessing a computer over a TCP/IP protocol network as claimed in claim 4 wherein said advertising information may be received by said advertising publisher computer through a posting web page.

7. A system for accessing a computer over a TCP/IP protocol network as claimed in claim 1 wherein said plurality of host computers provide said advertising publisher computer with said advertising information.

8. A system for accessing a computer over a TCP/IP protocol network as claimed in claim 7 wherein said at least one advertiser computer provides a first web page having only HTML code to said advertising publisher and a second web page having HTML code and JAVA code to said advertising publisher computer, said first web page having a link to said second web page and said publisher computer operable to provide said first and second web page to said client computer.

9. A system for accessing a computer over a TCP/IP protocol network as claimed in claim 7 wherein said advertising information is electronically mailed to said advertising publisher computer.

10. A system for accessing a computer over a TCP/IP protocol network as recited in claim 7 wherein said advertising information is provided to said advertising publisher computer through said advertising publisher's web page.

11. A system for accessing a computer over a TCP/IP protocol network as claimed in claim 7 wherein said advertising information includes information allowing said client computer to establish a connection with said host computer.

12. A method for choosing a host machine coupled to a wide area network comprising:

providing advertisement information about a plurality of host computers connected to a wide area network to an advertiser machine connected to said wide area network, said advertisement information including availability information and compatibility information about said plurality of host computers;

searching said advertiser machine by a client computer connected to the wide area network to find a suitable host computer for said client computer;

sending selection information from said client computer to said advertiser machine, and receiving of said client computer connection information from said advertiser machine for a selected host computer; and establishing a connection between said client computer and said suitable host computer such that said client computer controls the functionality of said suitable host computer wherein input events to said client computer become input events to said suitable host computer and such that video output information of said suitable host computer becomes video output information of said client computer;

wherein said advertising information for said at least one host computer includes information about the poster of said host computer, password information for said host computer, and collaboration information for said host computer.

13. A method for choosing a host machine coupled to a wide area network as claimed in claim 12 wherein said advertisement information provided to said advertiser machine is provided by said host computer.

14. A method for choosing a host machine coupled to a wide area network as claimed in claim 12 wherein searching said advertiser machine for a suitable host computer includes selecting a host computer from a list of host computers provided by said advertiser machine.

15. A method for choosing a host machine coupled to a wide area network as claimed in claim 12 wherein said connection information provided to said client computer includes a URL address.

16. A computer readable media having program instructions comprising:

a code segment providing advertisement information about a plurality of host computers connected to a wide area network to an advertiser machine connected to said wide area network, said advertisement information including availability information and compatibility information about said plurality of host computers;

a code segment searching said advertiser machine by a client computer connected to the wide area network to find a suitable host computer for said client computer;

a code segment sending selection information from said client computer to said advertiser machine, and receiving of said client computer connection information from said advertiser machine for a selected host computer; and a code segment establishing a connection between said client computer and said suitable host computer such that said client computer controls the functionality of said suitable host computer wherein input events to said client computer become input events to said suitable host computer and such that video output information of said suitable host computer becomes video output information of said client computer;

wherein said advertising information for said at least one host computer includes information about the poster of said host computer, password information for said host computer, and collaboration information for said host computer.

17. A method of providing an advertising machine capable of advertising available host machines over a wide area network comprising:
- providing an advertising machine connected to a network;
- providing a list of available host computers connected to said network on said advertising machine; and
- servicing a request for said list of available host computers to a client machine coupled to said network, such that said client machine may connect to a host computer selected from said list, whereby said client machine can control the functionality of said host computer over said network;
- wherein said advertising information for said at least one host computer includes information about the poster of said host computer, password information for said host computer, and collaboration information for said host computer.

18. A method of providing an advertising machine capable of advertising available host machines over a wide area network as claimed in claim 17 wherein said advertising information received by said advertising machine is provided by said host computers.

19. A method of providing an advertising machine capable of advertising available host machines over a wide area network as claimed in claim 18 wherein said advertising information received by said advertising machine includes connection information for said host computer, said connection information allowing said host computer to be accessed over a TCP/IP protocol network.

20. A method of providing an advertising machine capable of advertising available host machines over a wide area network as claimed in claim 17 wherein providing information about said available host computers includes creating a web page having said advertising information for said host computers.

21. A computer readable media having program instructions comprising:
- a code segment providing an advertising machine connected to a network;
- a code segment providing a list of available host computers connected to said network on said advertising machine; and
- a code segment servicing a request for said list of available host computers to a client machine coupled to said network, such that said client machine may connect to a host computer selected from said list, whereby said client machine can control the functionality of said host computer over said network;
- wherein said advertising information for said at least one host computer includes information about the poster of said host computer, password information for said host computer, and collaboration information for said host computer.

* * * * *